(12) United States Patent
Kim et al.

(10) Patent No.: US 11,483,512 B2
(45) Date of Patent: Oct. 25, 2022

(54) DISPLAY APPARATUS AND OPERATION METHOD THEREOF

(71) Applicant: SAMSUNG ELECTRONICS CO., LTD., Suwon-si (KR)

(72) Inventors: Taehwan Kim, Suwon-si (KR); Sungjin Son, Suwon-si (KR); Seungjin Park, Suwon-si (KR); Kwangsub Byun, Suwon-si (KR); Junghwan Choi, Suwon-si (KR); Byungkwon Kang, Suwon-si (KR); Seokjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/119,329

(22) Filed: Dec. 11, 2020

(65) Prior Publication Data
US 2021/0185267 A1    Jun. 17, 2021

(30) Foreign Application Priority Data
Dec. 12, 2019   (KR) .................. 10-2019-0166009

(51) Int. Cl.
*H04N 5/445* (2011.01)
*H04N 21/431* (2011.01)

(52) U.S. Cl.
CPC ..... *H04N 5/44504* (2013.01); *H04N 21/4312* (2013.01)

(58) Field of Classification Search
CPC ......... H04N 21/41407; H04N 21/4622; H04N 21/426; H04N 21/8146; H04N 2007/145; H04N 21/41265; H04N 21/42653
See application file for complete search history.

(56) References Cited

U.S. PATENT DOCUMENTS

| | | | |
|---|---|---|---|
| 9,342,467 B1 | 5/2016 | McGrath et al. | |
| 10,080,014 B2 | 9/2018 | Kwon et al. | |
| 2007/0143789 A1 | 6/2007 | Shiomi et al. | |
| 2008/0089660 A1 | 4/2008 | Hashimoto et al. | |
| 2008/0238938 A1 | 10/2008 | Eklund et al. | |

(Continued)

FOREIGN PATENT DOCUMENTS

| | | |
|---|---|---|
| KR | 10-2015-0081687 A | 7/2015 |
| KR | 10-2020-0110024 A | 9/2020 |
| WO | 2019/125036 A1 | 6/2019 |

OTHER PUBLICATIONS

Ip.com, "Method and system for shadow creation of Digital object in transparent display," An IP.com Prior Art Database Technical Disclosure, IPCOM000245836D, Apr. 13, 2016, Total 3 pages, XP013171261.

(Continued)

*Primary Examiner* — Samira Monshi
(74) *Attorney, Agent, or Firm* — Sughrue Mion, PLLC

(57) ABSTRACT

Provided are a display apparatus and an operation method thereof for preventing image flicker when displaying mixed images: generating a first image corresponding to video content on a first plane, generating, on a second plane, a second image, outputting a mixed image that is a mixture of the first image and the second image, generating a third image on a third plane corresponding to the mixed image, and displaying the third image based on removal of the first image from the display.

18 Claims, 16 Drawing Sheets

(56) References Cited

U.S. PATENT DOCUMENTS

| | | | |
|---|---|---|---|
| 2010/0150523 A1* | 6/2010 | Okubo | H04N 5/85 348/42 |
| 2015/0195514 A1 | 7/2015 | Kwon et al. | |
| 2018/0322679 A1 | 11/2018 | Kunkel et al. | |
| 2019/0197672 A1 | 6/2019 | Lee et al. | |

OTHER PUBLICATIONS

Communication dated Feb. 22, 2021, issued by the European Patent Office in European Application No. 20213344.3.

International Search Report and Written Opinion dated Mar. 15, 2021, issued by the International Searching Authority in International Application No. PCT/KR2020/018180 (PCT/ISA/220, 210, 237).

* cited by examiner

FIG. 4
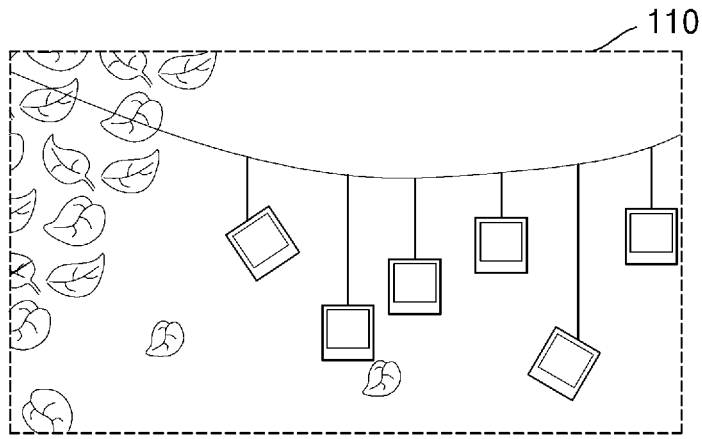
+
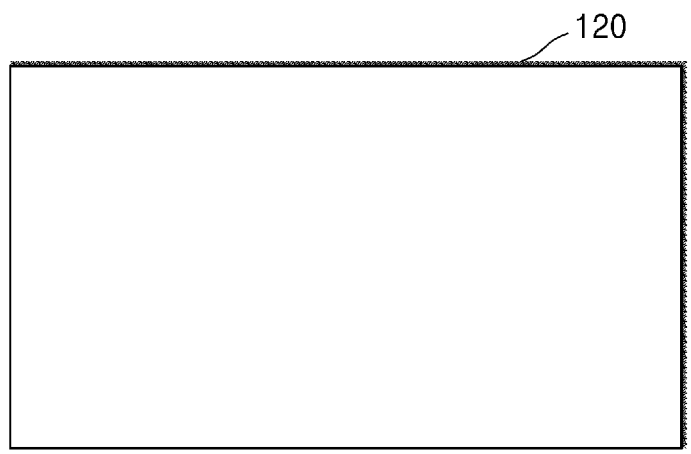
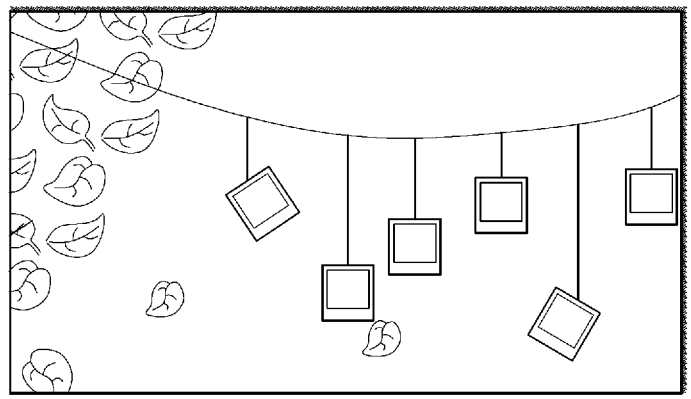

DISPLAY APPARATUS AND OPERATION METHOD THEREOF

CROSS-REFERENCE TO RELATED APPLICATION

This application is based on and claims priority under 35 U.S.C. § 119 to Korean Patent Application No. 10-2019-0166009, filed on Dec. 12, 2019, in the Korean Intellectual Property Office, the disclosure of which is incorporated by reference herein in its entirety.

BACKGROUND

1. Field

The disclosure relates to display apparatuses and operation methods thereof, and more particularly, to display apparatuses for mixing and reproducing images respectively generated in different planes for processing different data formats, and operation methods thereof.

2. Description of Related Art

A display apparatus processes image signals provided from an image signal supply source and displays the processed image signal on a display. The display apparatus includes a television (TV) receiver that receives and displays image signals supplied from a broadcasting station or other image source. In this configuration, the image signals correspond to content, and the TV receiver may be simply referred to as a TV.

Due to wide dissemination of display apparatuses and recent technological developments, display apparatuses with various shapes and functions are being actively developed. Accordingly, functions that meet various needs or intentions of consumers may be realized.

For example, when outputting an image of content onto a display, a display apparatus may process the image corresponding to the content in order to increase the satisfaction, aesthetic appreciation, and depth effect felt by a user viewing the image.

For example, an on screen display (OSD), a caption, or a sub-window including supplemental information may be incorporated into the image such that the user may perceive the additional information while viewing the image. In this configuration, the image corresponding to the content and an image corresponding to the OSD, the caption, or the sub-window may be combined, overlaid on, or mixed with the image of the content, and output onto a display.

In the above-described example, when a plurality of images are generated and processed on different planes, it is difficult to accurately synchronize time points when outputs of the plurality of images are respectively completed. In the above-described example, when the time points at which the outputs of the images are respectively completed do not coincide with one another, an image output onto the display may be an image other than an intended image, such as an incomplete or broken image.

Thus, when a plurality of images are mixed together for output, an incomplete or broken image should be prevented from being output onto a screen while the user views the screen, so that the user does not feel discomfort when viewing the mixed images.

SUMMARY

Provided are display apparatuses and operation methods thereof, which are capable of outputting, when a plurality of images are mixed, a screen that avoids causing a user discomfort when viewing the mixed images.

In particular, provided are display apparatuses and operation methods thereof whereby the user's discomfort may be eliminated by preventing an incomplete image from being output onto a screen when a plurality of images are mixed.

Additional aspects will be set forth in part in the description which follows and, in part, will be apparent from the description, or may be learned by practice of the presented embodiments of the disclosure.

According to an embodiment of the disclosure, a display apparatus includes: a display; and a processor configured to execute at least one instruction. Here, the processor is configured to execute the at least one instruction to generate, on a first plane, a first image corresponding to video content, generate, on a second plane, a second image, and control the display to output a mixed image that is a mixture of the first image and the second image; generate, on a third plane, a third image corresponding to the mixed image; and control the display to output the third image based on removal of the first image from the display.

The processor may be further configured to execute the at least one instruction to: control the display to remove the first image from the display, control the display to display the third image in response to the removal of the first image from the display, control the display to remove the second image from the display, and control the display to remove the third image from the display in response to removal of the second image from the display.

The processor may be further configured to execute the at least one instruction to, generate the third image by copying the mixed image on the third plane.

Furthermore, a first resolution of the first plane is higher than a second resolution of the second plane and a third resolution of the third plane is equal to the second resolution of the second plane.

Furthermore, a third display priority of the third plane is lower than a first display priority of the first plane and higher than a second display priority of the second plane.

Furthermore, the first plane may be a video plane, and the second and third planes may be both graphic planes.

Furthermore, the video plane may store an image in a luminance-chrominance (YUV) color space, and the graphic plane may store an image in a red-green-blue-alpha (RGBA) color space.

Furthermore, the second image may be superimposed over the first image in the mixed image.

Furthermore, the first image may be an image corresponding to the content, and the second image may include at least one of a caption, an on screen display (OSD), a sub-window, a frame image, or an object image displayed on top of the first image. In this configuration, the caption may include text.

The processor may include: a decoder configured to receive and decode a first image signal as the first image and a second image signal as the second image; a texture processor configured to store textures of the first image and the second image; a renderer configured to render the first image and the second image based on the textures; a video module configured to generate the first image on the first plane by processing the rendered first image; a graphics module configured to generate the second image on the second plane by processing the rendered second image and generate the third image on the third image plane; and a mixer configured to mix the first image and the second image as the mixed image.

The video module may be further configured to generate the first image by scaling and correcting the first image on the first plane.

The graphics module may be further configured to generate the second image by scaling and correcting the second image on the second plane.

The video module may be further configured to support a higher resolution output than the graphics module.

According to an embodiment of the disclosure, a method of operating a display apparatus for outputting an image via a display includes: generating, on a first plane, a first image corresponding to video content on a first plane and generating, on a first plane, a first image corresponding to video content; generating, on a second plane, a second image; outputting on the display a mixed image that is a mixture of the first image and the second image; generating, on a third plane, a third image corresponding to the mixed image; and outputting on the display the third image based on removal of the first image from the display.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram for explaining creation of the screen shown in FIG. 1;

DETAILED DESCRIPTION

Figure 1:
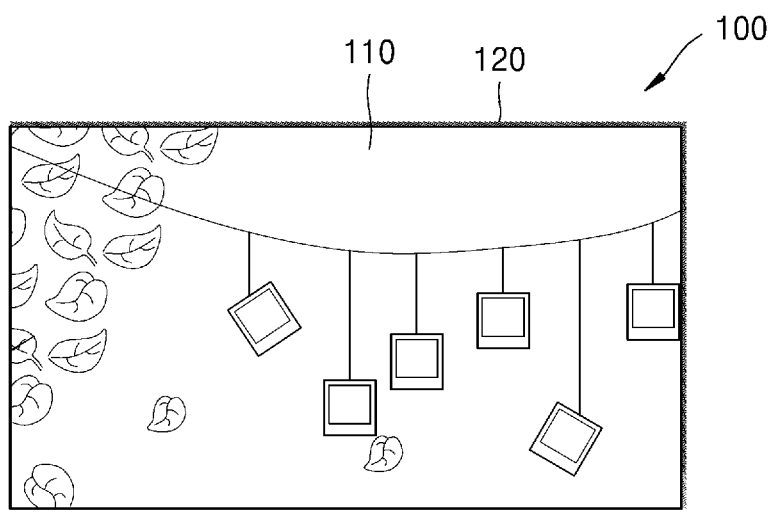
FIG. 1 illustrates an example of a screen output by a display apparatus according to an embodiment of the disclosure.

Embodiments of the disclosure will now be described more fully hereinafter with reference to the accompanying drawings to be easily implemented by those of ordinary skill in the art. However, embodiments of the disclosure may have different forms and should not be construed as being limited to the embodiments set forth herein. In addition, parts not related to the disclosure are omitted to clarify the description of the embodiments of the disclosure, and like reference numerals in the drawings denote like elements throughout.

Throughout the specification, when an element is referred to as being "connected" or "coupled" to another element, the element can be directly connected to or electrically coupled to the other element with one or more intervening elements interposed therebetween. Furthermore, when a part "includes" or "comprises" an element, unless there is a particular description contrary thereto, the part can further include other elements, not excluding the other elements.

Expressions such as "in some embodiments" or "in an embodiment" described in various parts of this specification do not necessarily refer to the same embodiment(s).

Some embodiments of the disclosure may be described in terms of functional block components and various processing operations. Some or all of such functional blocks may be implemented by any number of hardware and/or software components that perform specific functions. For example, functional blocks of the disclosure may be implemented by one or more microprocessors or by circuit components for performing certain functions. For example, functional blocks according to the disclosure may be implemented with any programming or scripting language. The functional blocks may be implemented using various algorithms executed on one or more processors. Furthermore, the disclosure may employ techniques of the related art for electronics configuration, signal processing and/or data processing. The words such as "module" and "configuration" may be used in a broad sense and are not limited to mechanical or physical embodiments.

Furthermore, connecting lines or connectors shown in various figures are intended to represent exemplary functional relationships and/or physical or logical couplings between components in the figures. In an actual device, connections between components may be represented by alternative or additional functional relationships, physical connections, or logical connections.

Throughout the disclosure, the expression "at least one of a, b or c" indicates only a, only b, only c, both a and b, both a and c, both b and c, all of a, b, and c, or variations thereof.

In an embodiment of the disclosure, a display apparatus may refer to any electronic device capable of receiving image signals, such as video signals and audio/video signals, and performing any processing necessary to visually output a corresponding image on a screen thereof.

In detail, according to an embodiment of the disclosure, the display apparatus may be a television (TV), a digital TV, a smart TV, a digital signage, a digital sign, a smartphone, a tablet PC, a personal digital assistant (PDA), a laptop computer, a media player, or the like.

Hereinafter, a display apparatus and an operation method thereof according to embodiments of the disclosure will be described in detail with reference to the accompanying drawings. In the drawings, the same elements are represented by the same reference symbols and numerals. Furthermore, throughout the detailed description, the same elements are represented by the same reference numerals.

In detail, a display apparatus according to an embodiment of the disclosure generates a plurality of images and then mixes the generated images to output a mixture thereof. Here, an image displayed on a display by mixing a plurality of images may be referred to as a mixed image or an "output image." In detail, the output image is an image visually recognized by a user of the display apparatus, and may mean an image provided for display on a screen of a display. Hereinafter, an output image displayed by a display apparatus according to an embodiment of the disclosure will be described with reference to FIGS. 1 through 5.

FIG. 1 illustrates an example of a screen output by a display apparatus according to an embodiment of the disclosure.

Hereinafter, it is assumed that the display apparatus receives an image signal corresponding to content desired to be viewed by a user, and generates an image corresponding to the received image signal. Then, the display apparatus may generate an output image by mixing the image corresponding to the received image signal with another image. For convenience of description, an image corresponding to a received image signal is hereinafter referred to as a 'first image.' In detail, the first image may be an image including an image corresponding to content desired to be viewed by the user. For example, the first image may be an image corresponding to the content, or an image including an image corresponding to the content and a background image combined with an outside of the image corresponding to the content. In addition, an image displayed as overlaid or superimposed on top of the first image is referred to as a 'second image.' In detail, the second image may be an image superimposed on at least a region of the first image.

In an embodiment of the disclosure, an image finally output via the display (in particular, an output image) is an image obtained by mixing the first image that is an image corresponding to the content with the second image that is an image added and displayed on top of the first image.

In detail, the first image may be a content image itself generated by converting the image signal corresponding to the content into an image. Furthermore, the first image that is the image corresponding to the content may include a content image generated by converting the image signal corresponding to the content into an image and a background image combined as a background for the content image.

In detail, the second image may be at least one of a caption, an on screen display (OSD), a sub-window, a frame image, or an object image displayed on top of at least a region of the first image. In this configuration, the caption may include text or other graphics. Furthermore, the sub-window is an image displayed on a region of a screen and may be referred to as a sub-window, a sub-screen, a floating window, or the like. In addition, the object image may represent a certain effect applied to the first image or a virtual object. For example, the object image may be an image with a shadow effect applied to the first image. Alternatively, the object image may be an image corresponding to a virtual object, such as a virtual watch, displayed on a region of the first image.

In detail, the second image may be an image that is to be generated by adjusting transparency such as a shadow effect. Furthermore, the first image may be a normal image whose transparency has not been adjusted.

Referring to FIG. 1, an output image 100 displayed by the display apparatus according to the embodiment of the disclosure may be an image obtained by mixing a content image 110 with an object image 120 exhibiting a shadow effect. In this configuration, the content image 110 may be referred to as a first image, and the object image 120 corresponding to the shadow effect may be referred to as a second image.

Figure 2:
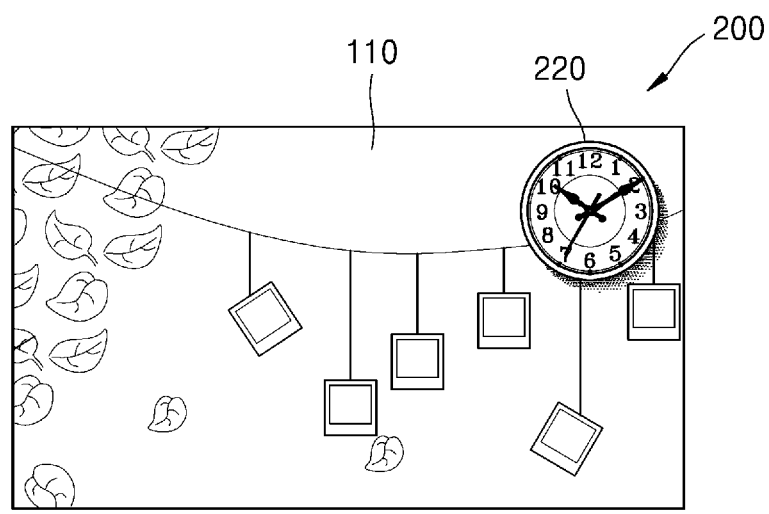
FIG. 2 illustrates an example of a screen output by a display apparatus according to an embodiment of the disclosure.

FIG. 2 illustrates an example of a screen output by a display apparatus according to an embodiment of the disclosure.

Referring to FIG. 2, an output image 200 displayed by the display apparatus according to the embodiment of the disclosure may be an image obtained by mixing a content image 110 with an object image representing a virtual watch 220.

Figure 3:
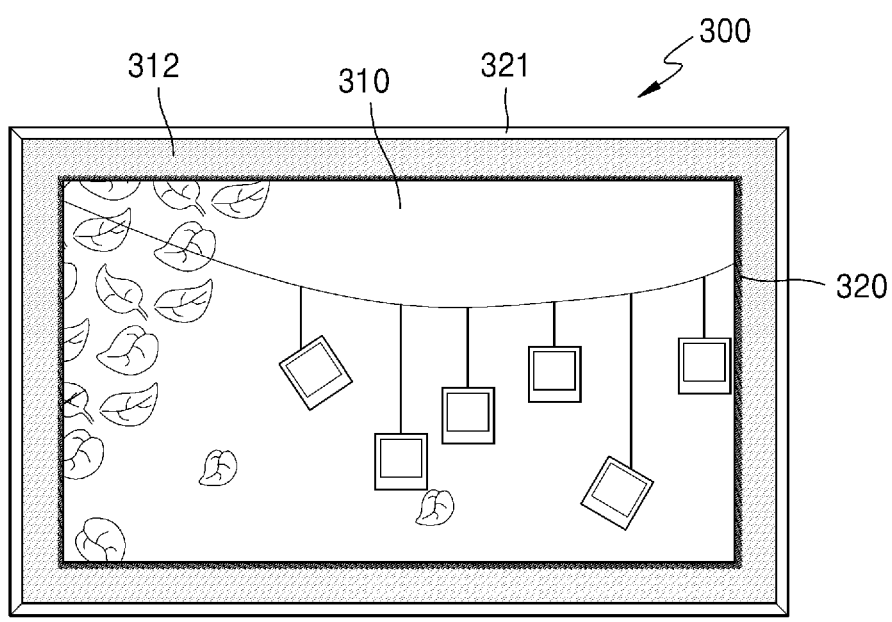
FIG. 3 illustrates an example of a screen output by a display apparatus according to an embodiment of the disclosure.

FIG. 3 illustrates an example of a screen output by a display apparatus according to an embodiment of the disclosure.

An output image 300 displayed by the display apparatus according to the embodiment of the disclosure may be an image obtained by mixing together a background image 312, a content image 310, and an object image exhibiting a shadow effect 320. Furthermore, the shadow effect 320 may be applied to at least one of the four corners forming a perimeter of the content image 310. The shadow effect may be additionally applied to at least one of the four corners forming an outer perimeter of the background image 312. Furthermore, the background image 312 may be an image representing an outline of a frame to which the image is attached, including borders of the frame. The background image 312 may also represent a wallpaper image on a wall surface to which the display apparatus is attached. Hereinafter, for convenience, an example in which the background image 312 represents a wallpaper image to which the content image 310 is attached is illustrated and described.

When the background image 312 underlying the content image 310 represents a wallpaper image on the wall surface to which the display apparatus is attached, the user may appreciate the continuity between the wall surface and the output image 300 displayed by the display apparatus and feel comfortable with the continuity. Thus, it is possible to increase the aesthetics or comfort experienced by the user when viewing a screen output via the display apparatus.

Referring to FIG. 3, the output image 300 may represent a frame to which a photo is attached, the content image 310 may represent the photo included in the frame, and the background image 312 may represent the underlying background of the photo.

FIG. 4 is a diagram for explaining creation of the screen shown in FIG. 1.

Referring to FIG. 4, the output image (100 of FIG. 1) may be generated by mixing the content image (110 of FIG. 1) with the object image (120 of FIG. 1) exhibiting a shadow effect. According to an embodiment of the disclosure, mixing may refer to an operation of generating the content image 110 to which the object image 120 is added by displaying the object image 120 on top of the content image 110.

Figure 5:
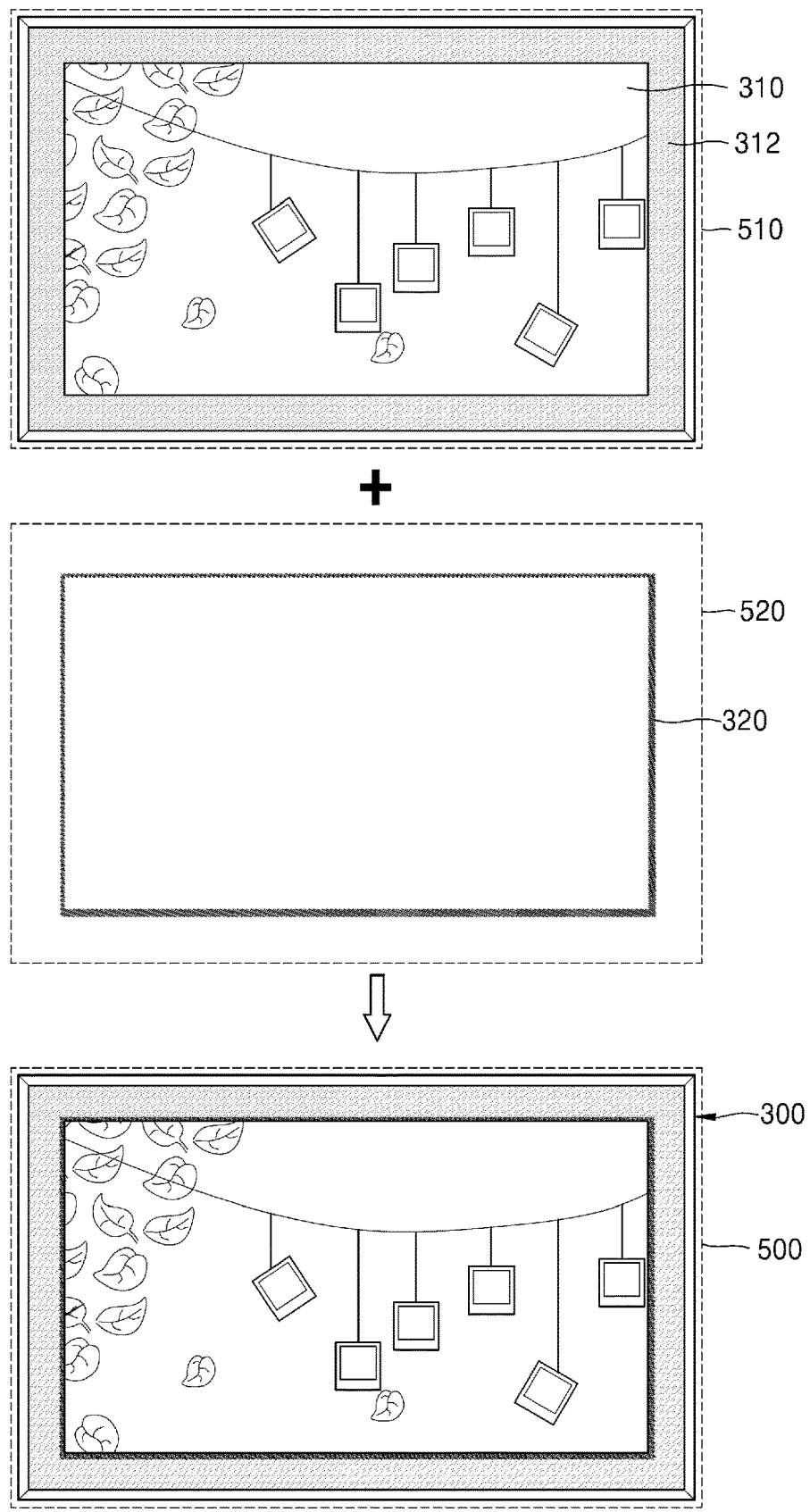
FIG. 5 is a diagram for explaining creation of the screen shown in FIG. 3.

FIG. 5 is a diagram for explaining creation of the screen shown in FIG. 3.

Referring to FIG. 5, the output image 300 may be an image obtained by mixing a first image 510 including the content image 310 with an object image 520 showing an object or effect displayed or rendered on the content image 310.

In detail, the output image 300 may be an image obtained by mixing together the background image 312, the content image 310, and the object image 520 exhibiting the shadow effect 320. In other words, the first image 510 may be an image generated based on the content image 310 and the background image 312 captured as an underlying background of the content image 310. Accordingly, the output image 300 displayed by a display apparatus may be an image obtained by mixing together the background image 312, the content image 310, and the object image 520 exhibiting the shadow effect 320.

FIG. 5 shows an example in which the background image 312 is an image showing a frame to which the content image 310 is combined. Thus, when the display apparatus displays the output image 300, the user may recognize that the user is viewing the frame to which the content image 310 is attached.

When the display apparatus is a frame TV, the image may be output in the form of a frame image. When a frame TV is used as the display apparatus, a user may feel that an image is displayed within a frame, and the frame TV may be utilized as an interior accessory such as a picture frame. In detail, the frame TV may display an image corresponding to content together with a frame (a picture frame). In this configuration, the image output from the frame TV may be formed to have a form of a frame in which a content image is combined with a background image of the frame.

As described with reference to FIGS. 1 through 5, when two images are mixed to generate an output image, a content image (in particular, a first image) corresponding to content desired to be viewed by the user may be generated as an image with a high resolution. In addition, an image added onto the content image (in particular, a second image) may be generated as an image with a lower resolution than the content image. In general, in processing a plurality of images having different resolutions, a display apparatus may use different planes respectively corresponding to the different resolutions.

For convenience of description, a plane used to output of a high-resolution image is hereinafter referred to as a first plane, and a plane used to output of a low-resolution image compared to the first plane is hereinafter referred to as a second plane.

In detail, the first plane may be a plane used to generate and/or process an 8K image and each of the second plane and a third plane may be a plane capable of generating and/or processing a 2K or 4K image.

According to an embodiment of the disclosure, the first plane may be a video plane, and the second plane may be a graphic plane. Furthermore, the third plane may be a graphic plane.

Thus, a resource necessary to process and/or generate an image on the first plane (e.g., a memory capacity, performance of high-end memory with a high processing speed, etc.) may have a greater capacity and achieve higher performance than a resource necessary to process and/or generate an image on the second plane. In this configuration, the resource may be a hardware resource such as a memory or processor for generating an image.

For example, a video plane that is the first plane may be used to process and/or generate of an image having a resolution of 8K, while a graphic plane that is the second plane may be used to process and/or generate of an image having a resolution of 2K or 4K. In this configuration, a capacity of memory allocated to the video plane may be larger than a capacity of memory allocated to the graphic plane, and the performance such as the processing speed of the memory allocated to the video plane may be higher than the processing speed of the memory allocated to the graphic plane. Herein, the memory allocated to the graphic plane may be a graphic buffer, and the memory allocated to the video plane may be a video buffer.

A problem encountered in mixing images respectively generated on the video plane and the graphic plane and outputting a mixture of the images is now described with reference to FIG. 6.

Figure 6:
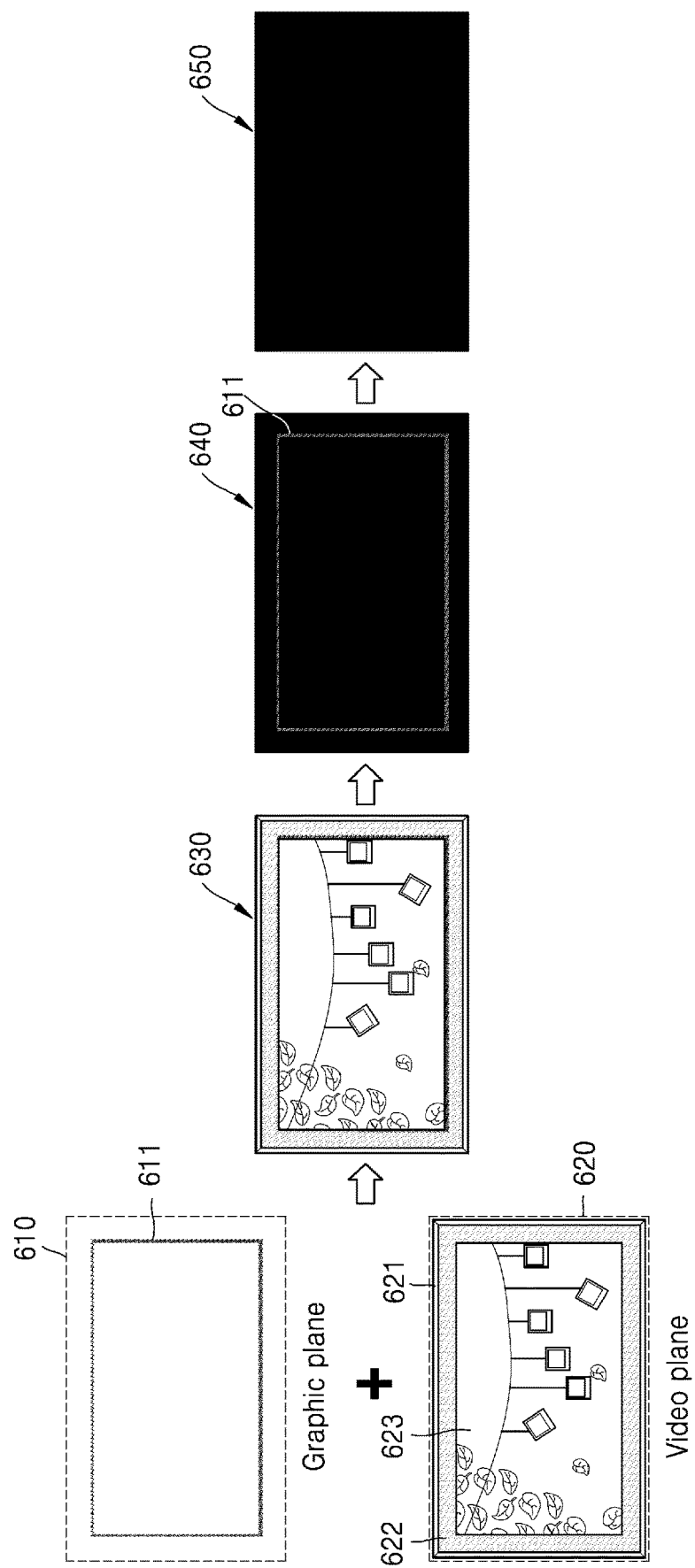
FIG. 6 is a diagram for explaining an incomplete screen that may appear when mixed images are displayed.

FIG. 6 is a diagram for explaining an incomplete screen that may appear when mixed images are displayed.

In FIG. 6, a display apparatus outputs an image obtained by mixing a content image with an image to which a shadow effect is applied as described with reference to FIG. 5. When removing the mixed image from the display, such that a new image may be displayed, a problem that arises due to a difference in time when the graphics image and the video image of the mixed image are removed from the display. For example, the graphics image and the video image, which are components of the mixed image, may be removed from the display when a next image is to be displayed.

Referring to FIG. 6, an image 610 corresponds to the second image 520 exhibiting the shadow effect 320 illustrated in FIG. 5, and an image 620 corresponds to the first image 510 of FIG. 5. An image 630 corresponds to the output image 300 shown in FIG. 5. Thus, redundant descriptions with respect to FIG. 5 will be omitted here in describing the images 610, 620, and 630 shown in FIG. 6. The images 610 and 620 are hereinafter referred to as second and first images 610 and 620, respectively, and the image 630 is hereinafter referred to as an output image 630.

Like in FIG. 5, an example in which the first image 620 includes a content image 623 and a background image 622 showing a background for the content image 623 is described with reference to FIG. 6.

Referring to FIG. 6, the display apparatus may generate the first image 620 including the content image 623 on a first plane and generate the second image 610 showing a shadow effect 611 on a second plane. Then, after generating both the first and second images 620 and 610, the display apparatus may generate the output image 630 that is a mixture of the first and second images 620 and 610 and display the output image 630 on a display.

After the output image 630 is provided, when the display apparatus desires to change the output image 630 to a next image or remove the output image 630 from the display, a process for removing the output image 630 from the display is performed. In detail, to remove the output image 630 from the display, the first and second images 620 and 610 respectively generated on the first and second planes are each removed. In this configuration, the removal of the images from the planes refers to a process of releasing a resource for a generated image such that the image disappears from a corresponding plane. According to an embodiment of the disclosure, 'completing output of an image' has the same meaning as 'releasing a resource for an image.' Thereby, a next image may be generated using the image processing resources.

In other words, to remove the output image 630 from the display, a resource for each of the first image 620 generated on the first plane and the second image 610 generated on the second plane should be released. When resource release is completed, the first image 620 disappears from the first plane, and the second image 610 disappears from the second plane. In this configuration, the first and second planes are different planes, and the first and second images 620 and 610 may respectively disappear from the first and second planes at different points in time.

For example, the first plane may be a video plane and the second plane may be a graphic plane. A third plane may also be a graphic plane that is the same type of plane as the type of the second plane. In this configuration, when releasing of resources for the first and second images 620 and 610 is performed, a time point at which the first image 620 on the video plane disappears is earlier than a time point at which the second image 610 on the graphic plane disappears. This is because hardware resources for processing the first image 620 on the video plane, which may process more complex video images, may be more robust than the hardware resources for processing the second image 610 on the graphics plane, which may be less robust because of the lightweight graphics processing necessary to process graphics. In other words, even when the first image 620 disappears, the second image does not disappear and remains visible on the graphic plane for several seconds because the robust processing allocated to the video plane is quicker than the lightweight processing allocated to the graphics plane. Thus a flicker effect of the first image 620 and the second image 610 may be perceived by the viewer when the images are removed from the screen at different points of time.

Referring to FIG. 6, when the first image 620 on the video plane disappears, but the second image on the graphic plane does not completely disappear, the display apparatus outputs an image 640 on a screen. In other words, the first image 620 including the content image 623 is not displayed on the screen of the display apparatus while a shadow effect 611 shown on the second image 610 is still displayed thereon. In detail, because the first image 620 including the content image 623 disappears due to resource release, a black screen appears over the entire screen on which the first image 620 was displayed, but the shadow effect 611 may still be displayed on the black screen. As a result, distortion in the image displayed on the screen occurs.

Subsequently, when the second image 610 completely disappears on the second plane, the display apparatus outputs a complete black image 650 as the first and second images 620 and 610 are both removed. Thereby, the mixed image may be completely removed from being displayed, and a next image may be displayed.

Referring to FIG. 6, the image 640 may be an incomplete image that is neither a completely black screen nor an image representing meaningful content. The display apparatus may display the incomplete image 640 for several seconds until the second image 610 completely disappears from the graphic plane, and the user views the image 640 having an incomplete composition. Accordingly, the user may experience discomfort when watching the display apparatus.

According to an embodiment of the disclosure, discomfort experienced by the user while viewing the display apparatus may be avoided by eliminating display of the incomplete image 640 shown in FIG. 6.

Hereinafter, a display apparatus and an operation method thereof according to embodiments of the disclosure, which are capable of increasing a user's viewing satisfaction and minimizing discomfort experienced by the user when viewing the display apparatus by addressing the above-described problem, will be described in more detail with reference to FIGS. 7 through 16.

Figure 7:
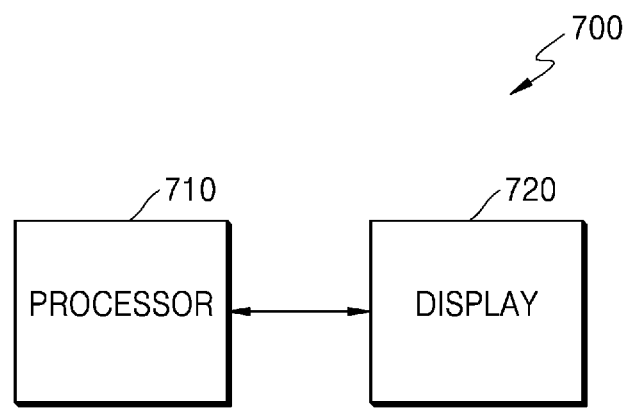
FIG. 7 is a block diagram of a display apparatus according to an embodiment of the disclosure.

FIG. 7 is a block diagram of a display apparatus 700 according to an embodiment of the disclosure.

Referring to FIG. 7, the display apparatus 700 includes a processor 710 and a display 720.

The processor 710 executes at least one instruction of a program or computer-readable codes stored in a memory or programmed using other hardware of the display apparatus 700.

In detail, the processor 710 controls an intended operation to be performed by executing at least one instruction. In this configuration, the at least one instruction may be stored in an internal memory on board the processor 710 or a memory included in the display apparatus 700 separately from the processor 710.

In detail, the processor 710 may execute at least one instruction to control at least one component included in the display apparatus 700 such that an intended operation is performed. Thus, even when it is described that the processor 710 performs certain operations, it may be understood that the processor 710 controls at least one component included in the display apparatus 700 such that certain operations are performed.

The display 720 outputs an image on a screen. In detail, the display 720 may output an image corresponding to image signals or video data via a display panel incorporated therein such that a user may visually recognize the video data.

In detail, the processor 710 may include at least one processor and a memory that stores data of signals or data input from outside of the display apparatus 700 or is used as a storage area corresponding to various operations performed by the display apparatus 700. Furthermore, the processor 710 may be formed to include at least one processor.

In detail, the processor 710 may include the at least one processor, random access memory (RAM) that stores signals or data input from outside of the display apparatus 700 or is used as a storage area corresponding to various operations performed by the display apparatus 700, and read-only memory (ROM) that stores a control program and/or a plurality of instructions for controlling the display apparatus 700. Furthermore, the at least one processor may include a graphics processing unit (GPU) for processing image signals or data used to generate an image. Here, 'processing' may mean performing at least one of receiving, converting (in particular, converting a format, size, and/or characteristics), generating, or processing an image by using a signal or data.

Furthermore, the at least one processor may be implemented as a system on chip (SOC) that integrates a core with the GPU. In addition, the processor 710 may include more than a single core, i.e., multiple cores. For example, the processor 710 may include dual-core (2 cores), triple-core (3 cores), quad-core (4 cores), hexa-core (6 cores), octa-core (8 cores), deca-core (10 cores), dodeca-core (12 cores), hexadeca-core (16 cores), etc.

In an embodiment of the disclosure, the processor 710 generates a first image corresponding to content on a first plane, generates a second image displayed on top of the first image on a second plane, and outputs a mixture of the first and second images on the display 720. Furthermore, the processor 710 may generate, based on the first and second images, a third image on a third plane corresponding to the second plane and control the display 720 to output the third image in response to output of the first image being completed. Here, because the first image, the second image, the first plane, and the second plane correspond to their counterparts described and defined with reference to FIGS. 1 through 6, redundant descriptions thereof will be omitted below.

In detail, generation of the first image and generation of the second image may be performed in parallel via independent paths or pipelines.

Furthermore, an operation of generating the third image may be performed when generation of the first and second images is completed. Alternatively, an operation of generating the third image may be performed when generation of the output image is completed.

In detail, the first plane is a plane supporting a high-resolution output compared to the second plane. For example, the first plane may be a plane used to generate an image of a 4K resolution, and the second plane may be a plane used to generate an image of a 2K resolution. Furthermore, when a high-resolution image needs to be generated, such an image may be generated and/or processed on the first plane.

Furthermore, the third plane may be the same type of plane as the second plane. In detail, the third plane may be a plane that is located below the first plane and is seen via the display 720 after the output of the first image on the first plane is completed. Here, when a plane is 'located below' another plane, it may be understood that an image on the plane is output on the display 720 with a lower priority than an image on a higher plane.

For example, when the third plane is located below the first plane, the third image on the third plane may not be output on the display 720 when the first image on the first plane is output on the display 720. Subsequently, when the first image on the first plane is removed and is not output onto the display 720, the third image on the third plane located below the first plane may be output and displayed on the display 720.

In detail, the processor 710 may generate the third image based on the first and second images.

The processor 710 may allocate a buffer of a memory required for generating the third image and may generate a third image by using the allocated buffer. In detail, the processor 710 may allocate a buffer as the third plane required for generating the third image when generation of the first and second images is completed or when generation of an output image is completed. Herein, the buffer allocated as the third plane may be a graphic buffer.

In detail, when the generation of the first and second images is completed, the processor 710 may allocate a buffer as the third plane required for generating the third image (e.g., a memory corresponding to the third plane) and perform an operation of generating the third image by using the allocated buffer. Alternatively, when the generation of the output image is completed, the processor 710 may allocate a buffer as the third plane required for generating the third image (e.g., a memory corresponding to the third plane) and perform an operation of generating the third image by using the allocated memory.

In this configuration, the third image may have a different resolution than the output image, but may have the same shape as the shape of the output image. For example, when the first and second images respectively have a 4K resolution and a 2K resolution, the output image may have a 4K resolution. In the above example, an image having a 2K resolution may be generated on the third plane corresponding to the second plane at which the second image having a 2K resolution is generated. Accordingly, the third image generated on the third plane may have a 2K resolution. In other words, the third image has a lower resolution than the output image but has the same shape as the output image. Furthermore, because the third image has a lower resolution than the output image, the processor 710 may quickly generate the third image by using less memory than the output image.

In detail, the processor 710 may generate the third image by copying, on the third plane, an image, i.e., the output image, obtained by mixing the first and second images. In other words, the third image may be a copy of the output image generated on the third plane.

Alternatively, the processor 710 may generate the third image by copying each of the first and second images on the third plane. In other words, the third image may be an image obtained by mixing (or combining) copies of the first and second images generated on the third plane.

In detail, after the first and second images are mixed together and then the output image is output on the display 720, the processor 710 may generate the third image by copying the output image on the third plane. Furthermore, the processor 710 may perform the operation of generating the third image before the first image is removed from the display.

In this configuration, the first plane may be a video plane, and the second and third planes may be graphic planes. Here, the video plane may be a plane presented to process an image in a YUV color space. Furthermore, the graphic plane may be a plane presented to process an image in an RGB color space or an RGBA color space.

Hereinafter, for convenience, an example in which a graphic plane is presented to process an image in an RGBA color space is illustrated and described.

In this configuration, YUV is used as a video data format and is a color format used for transmission of video data from a TV to a color space. Transmission to a color space means transmission of two-dimensional (2D) colors using a frequency and an amplitude of a color subcarrier. In detail, YUV is the abbreviation used to refer to an analog luminance signal and chrominance signals in a component video system. Y represents a luminance signal, and U and V represent two subcarrier center axes used in a phase alternating line (PAL) method. YUV allows transmission using a smaller bandwidth than an RGB format. In detail, Y is luminance (lightness and darkness) and U (Cb) and V (Cr) are respectively a blue component and a red component in the luminance.

In addition, RGBA is a color value system in which an alpha channel (or alpha value) representing color transparency is added to the existing RGB color. Here, as the name suggests, RGB color is a color value system that constructs colors from combinations of red (R), green (G), and blue (B) colors. RGBA may be expressed as RGBA (red, green, blue, alpha). Here, red, green, blue, and alpha in the parentheses respectively denote a red color value, a green color value, a blue color value, and a value representing the level of transparency or opacity of a color. Furthermore, the red, green, and blue color values may each be expressed as 256 levels by using an 8-bit signal value. In addition, the alpha value may be expressed as a value from 0 to 1, and 0 and 1 may respectively represent fully transparent and fully opaque.

The processor 710 may also remove the third image based on the removal of the output of the second image. The processor 710 may control the display 720 such that the third image may be removed from the display at the same time as or after the second image is removed from the display. In detail, the processor 710 may remove the third image from the display based on the time point at which the second image is removed from the display. Alternatively, the processor 710 may remove the third image from the display after the time point when the second image is removed from the display. Thus, the third image may be output onto the display 720 between the time point when the first image is removed from the display and the time point when the second image is removed from the display. Accordingly, it is possible to prevent the incomplete image 640 described with reference to FIG. 6 from being output on the display 720. In other words, when the mixed image is to transition to a new mixed image to be displayed, the first image may be removed from the display and the third image may be displayed. Accordingly, the third image, which is a copy of the mixed image, may be displayed. When the second image is removed from the display, then the third image may be removed from the display. A next mixed image may then be displayed. The display of the third image prevents the user from viewing a scenario in which the first image and the second image of the mixed image are removed from the display at different times.

Detailed operations and detailed configuration of the processor 710 will be described more fully below with reference to FIGS. 10 through 14.

Figure 8:
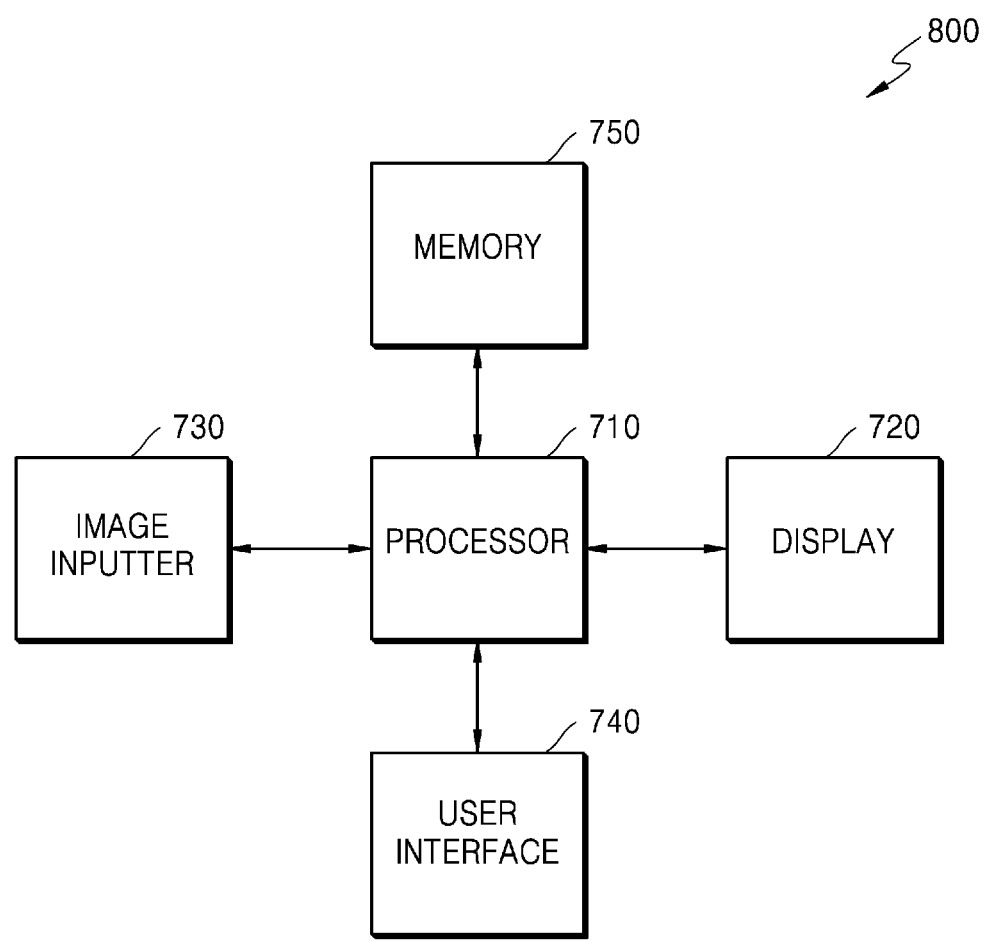
FIG. 8 is a block diagram of a display apparatus according to an embodiment of the disclosure.

FIG. 8 is a block diagram of a display apparatus 800 according to an embodiment of the disclosure. The display apparatus 800 of FIG. 8 may correspond to the display apparatus 700 of FIG. 7. Referring to FIG. 8, the display apparatus 800 may further include at least one of an image inputter 730, a memory 750, and a user interface (UI) 740.

The image inputter 730 may be an interface that receives incoming data from various data sources. For example, the image inputter 730 may include a tuner for receiving a live stream coming through broadcasting, a universal serial bus (USB) for playing back a video, a high-definition multimedia interface (HDMI) for receiving an external input, a component, etc.

Furthermore, the image inputter 730 may receive input data having various formats. Here, data received via the image inputter 730 may have formats such as RGBA, YUV, etc. In addition, the image inputter 730 may receive a plurality of input data (in particular, image resources) having various formats. In detail, the image inputter 730 may receive at least one of data used to generate a second image (e.g., data corresponding to a shadow effect), data corresponding to content desired to be viewed by the user, or image data corresponding to a background in a screen output onto the display 720.

Hereinafter, an example in which data input to the image inputter 730 and used to generate the second image is data representing a shadow effect will be illustrated and described.

For example, to display the output image 300 shown in FIG. 3 on the display 720, the image inputter 730 may receive input data corresponding to the background image 312, input data corresponding to the content image 310, and input data corresponding to the shadow effect 320. In other words, the processor 710 may receive input data corresponding to the background image 312, input data corresponding to the content image 310, and input data corresponding to the shadow effect 320 and generate the output image 300 based on the received pieces of input data.

The memory 750 may store at least one instruction. In detail, the memory 750 may store at least one instruction executed by the processor 710. Furthermore, the memory 750 may store at least one program executed by the processor 710.

In addition, the memory 750 may provide a memory area necessary for the processor 710 to perform a preset operation. For example, the processor 710 may generate and process an image by using at least one area in the memory 750.

In detail, the memory 750 may include at least one of types of storage media, i.e., a flash memory-type memory, a hard disk-type memory, a multimedia card micro-type memory, a card-type memory (e.g., an SD card or an XD memory), RAM, static RAM (SRAM), ROM, electrically erasable programmable ROM (EEPROM), PROM, a magnetic memory, a magnetic disc, or an optical disc.

The UI 740 may receive a user input for controlling the display apparatus 800. The UI 740 may include an input device consisting of a touch panel for sensing a user's touch, a hardware button for receiving a user's push manipulation, a wheel for receiving a user's rotation manipulation, a keyboard, a dome switch, etc., but the user interface 740 is not limited thereto.

In addition, the UI 740 may include a microphone and a voice recognition device for performing voice recognition. For example, the voice recognition device may be a speech-to-text engine, and the voice recognition device may receive a user's voice command or voice request. Accordingly, the processor 710 may control an operation corresponding to a voice command or voice request to be performed.

In addition, the UI 740 may include a motion detection sensor. For example, the motion detection sensor may detect movement of the display apparatus 800 or movement of a user's hand and receive the detected movement as a user input. Furthermore, the voice recognition device and the motion detection sensor may not be included in the UI 740, but may be included in the display apparatus 800 as a module separate from the UI 740.

Figure 9:
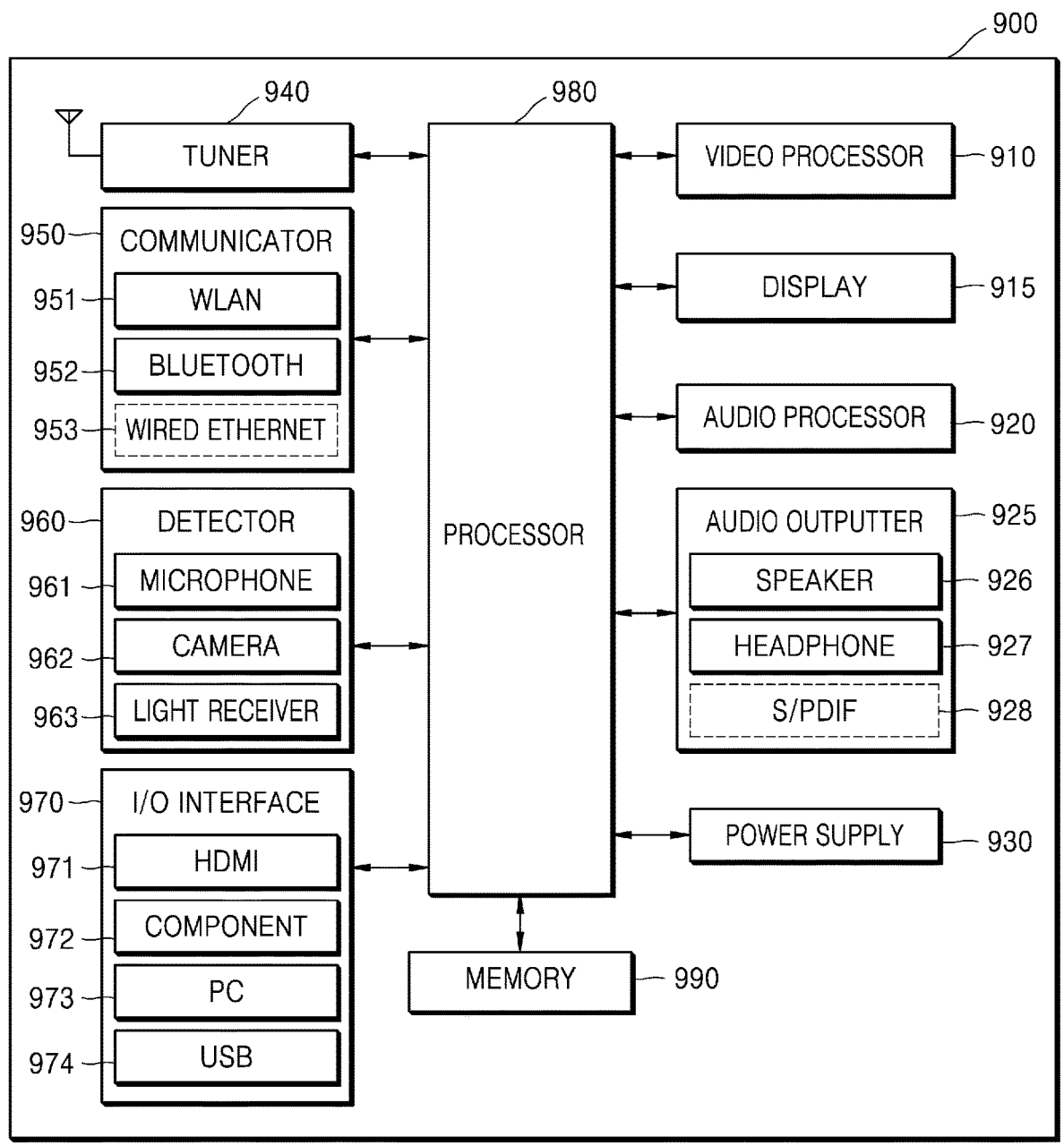
FIG. 9 is a detailed block diagram of a display apparatus according to an embodiment of the disclosure.

FIG. 9 is a detailed block diagram of a display apparatus 900 according to an embodiment of the disclosure. The display apparatus 900 may correspond to the display apparatus 700 or 800 according to the embodiment of the disclosure described with reference to FIGS. 1 through 8. Thus, redundant descriptions with respect to FIGS. 1 through 8 will be omitted when describing the display apparatus 900.

In detail, a processor 980, a display 915, and a memory 990 included in the display apparatus 900 of FIG. 9 may respectively correspond to the processor 710, the display 720, and the memory 750 included in the display apparatus 800 of FIG. 8.

Furthermore, a tuner 940 and an input/output (I/O) interface 970 of FIG. 9 may correspond to the image inputter 730 of FIG. 8.

A video processor 910 processes data, i.e., video data, received by the display apparatus 900. The video processor 910 may perform various types of image processing, such as decoding, scaling, noise filtering, frame rate conversion, and resolution conversion, on the video data.

According to an embodiment of the disclosure, the video processor 910 may be included in the processor 710 or 980. In other words, the processor 710 described with reference to FIGS. 7 and 8 may perform operations performed by the video processor 910.

The processor 980 may receive a request to write the video data processed by the video processor 910, encrypt the video data, and control the encrypted video data to be written into a memory device included in the memory 990, such as RAM.

The display 915 display, on a screen, video contained in a broadcast signal received via the tuner 940 according to control by the processor 980. Furthermore, the display 915 may display content (e.g., a moving image) input via a communicator 950 or the I/O interface 970.

The display 915 may output an image stored in the memory 990 according to control by the processor 980. Furthermore, the display 915 may display a voice UI (for example, including a voice command guide) for performing a voice recognition task corresponding to voice recognition or a motion UI (for example, including a user motion guide for motion recognition) for performing a motion recognition task corresponding to motion recognition.

An audio processor 920 processes audio data. The audio processor 920 may perform various types of processing, such as decoding, amplification, noise filtering, etc., on the audio data. Moreover, the audio processor 920 may include a plurality of audio processing modules to process audio corresponding to a plurality of pieces of content.

An audio outputter 925 outputs audio contained in a signal received via the tuner 940 according to control by the processor 980. The audio outputter 925 may output audio (e.g., a voice, sound) input via the communicator 950 or the I/O interface 970. Furthermore, the audio outputter 925 may output audio stored in the memory 990 according to control by the processor 980. The audio outputter 925 may include at least one of a speaker 926, a headphone output terminal 927, or a Sony/Phillips Digital Interface (S/PDIF) output terminal 928. The audio outputter 925 may include a combination of the speaker 926, the headphone output terminal 927, or the S/PDIF output terminal 928.

A power supply 930 supplies, according to control by the processor 980, power input by an external power source to internal components 910 through 990 of the display apparatus 900. The power supply unit 930 may also supply, according to control by the processor 980, power output from one or more batteries located within the display apparatus 900 to the internal components 910 through 990.

By performing amplification, mixing, resonance, etc. of a broadcast signal received in a wired or wireless manner, the tuner 940 may tune and then select only a frequency of a channel that is to be received by the display apparatus 900 from among many radio wave components. The broadcast signal may include, for example, audio, video, and additional information (e.g., an electronic program guide (EPG)).

The tuner 940 may receive a broadcast signal in a frequency band corresponding to a channel number (e.g., cable broadcast channel 506) according to a user input (e.g., control signals received from an external control device, e.g., a remote controller, such as input of a channel number, input of channel up-down, and input of a channel on an EPG screen).

The tuner 940 may receive broadcast signals from various sources such as terrestrial broadcasting, cable broadcasting, satellite broadcasting, Internet broadcasting, etc. The tuner 940 may receive broadcast signals of various types from sources such as analog broadcasting, digital broadcasting, etc. A broadcast signal received via the tuner 940 undergoes decoding (e.g., audio decoding, video decoding, or additional information decoding) to be separated into audio, video and/or additional information. The audio, video, and/or additional information may be stored in the memory 990 according to control by the processor 980.

The tuner 940 of the display apparatus 900 may include one or a plurality of tuners. According to an embodiment of the disclosure, when the tuner 940 is configured as a plurality of tuners, a plurality of broadcast signals may be output on a plurality of partial screens constituting a multi-view screen provided in the display 915.

The tuner 940 may be combined with the display apparatus 900 in the form of all-in-one or may be implemented as a separate apparatus having a tuner electrically connected to the display apparatus 900 (e.g., a set-top box, a tuner connected to the I/O interface 970, etc.).

The communicator 950 may connect the display apparatus 900 to an external device (e.g., an audio device, etc.) according to control of the processor 980. The processor 980 may transmit data to or receive data from the external device connected via the communicator 950, download an application from the external device, or browse the web. In detail, the communicator 950 may connect to a network, such as a local area network, wire area network, wireless network etc. to receive content from an external device.

As described above, the communicator 950 may include at least one of a short-range communication module, a wired communication module, and a mobile communication module.

FIG. 9 shows an example in which the communicator 950 includes one of a wireless local area network (WLAN) 951, a Bluetooth communicator 952, and a wired Ethernet 953.

Furthermore, the communicator 950 may include a module combination including one of the WLAN 951, the Bluetooth communicator 952, and the wired Ethernet 953. In addition, the communicator 950 may receive a control signal from a control device according to control by the processor 980. The control signal may be implemented in the form of a Bluetooth signal, an RF signal, or a Wi-Fi signal.

The communicator 950 may further include a short-range communication (e.g., near field communication (NFC)) other than Bluetooth and a separate Bluetooth Low Energy (BLE).

The detector 960 detects a user's voice, images, or interactions.

The detector 960 may include a microphone 961 that receives a voice uttered by the user. The microphone 961 may convert the received voice into an electrical signal and output the electrical signal to the processor 980. For example, the user's voice may include a voice corresponding to a menu or function of the display apparatus 900. For example, a recommended recognition range of the microphone 961 may be within 4 m from the microphone 961 to a user's location and may vary according to a volume of the user's voice and a surrounding environment (e.g., a speaker sound, ambient noise, etc.).

The microphone 961 may be built into or may be separate from the display apparatus 900. The external microphone 961 may be electrically connected to the display apparatus 900 via the communicator 950 or the I/O interface 970.

It will be readily understood by those of ordinary skill in the art that the display apparatus 900 may not include the microphone 961 depending on the performance and structure of the display apparatus 900.

The camera 962 receives an image (e.g., consecutive frames) corresponding to a user's motion including his or her gesture performed within a recognition range of the camera 962. For example, the recognition range of the camera 962 may be within 0.1 m to 5 m from the camera 962 to the user. For example, the user's motion may include a motion of a part of a user's body or a part of the user such as the user's face, facial expression, hand, fist, finger, etc. The camera 962 may convert the received image into an electrical signal and output the electrical signal to the processor 980 according to control by the processor 980.

The processor 980 may select a menu displayed by the display apparatus 900 based on the received motion recognition result or perform control corresponding to the motion recognition result. For example, the control may include channel adjustment, volume adjustment, and indicator movement.

The camera 962 may include a lens and an image sensor. The camera 962 may support an optical zoom or digital zoom by using a plurality of lenses and image processing. The recognition range of the camera 962 may be set differently according to an angle of the camera 962 and surrounding environmental conditions. When the camera 962 is configured as a plurality of cameras, the camera 962 may receive a three-dimensional (3D) still image or a 3D motion by using the plurality of cameras.

The camera 962 may be built into or be separate from the display apparatus 900. An external device including the camera 962 may be electrically connected to the display apparatus 900 via the communicator 950 or the I/O interface 970.

It will be readily understood by those of ordinary skill in the art that the display apparatus 900 may not include the camera 962 depending on the performance and structure of the display apparatus 900.

A light receiver 930 receives an optical signal (including a control signal) from an external control device via a light window, and may be disposed for example on a bezel of the display 915. The light receiver 963 may receive an optical signal corresponding to a user input (e.g., touching, pressing, touch gesture, voice, or motion) from the external control device. A control signal may be extracted from the received optical signal according to control by the processor 980.

For example, the light receiver 963 may receive a signal corresponding to a pointing position of the control device and transmit the received signal to the processor 980. For example, when a UI screen for receiving data or commands from the user is output on the display 915, and the user desires to input data or commands to the display apparatus 900 via the control device, the light receiver 963 may receive a signal corresponding movement of the control device when the user moves the control device while contacting a touch pad with a finger and outputs the received signal to the processor 980. Furthermore, the light receiver 963 may receive a signal indicating that a particular button provided on the control device has been pressed and transmit the signal to the processor 980. For example, when the user presses a button-type touch pad provided on the control device using a finger, the light receiver 963 may receive a signal indicating that the button-type touch pad has been pressed and transmit the signal to the processor 980. For example, the signal indicating that the button type touch pad is pressed may be used as a signal for selecting one of the items.

The I/O interface 190 receives video (e.g., a moving image, etc.), audio (e.g., voice, music, etc.), additional information (e.g., an EPG, etc.), etc. from outside of the display apparatus 900 according to control by the controller 980. The I/O interface 970 may include one of a HDMI port 971, a component jack 972, a PC port 973, and a USB port 974. The I/O interface 970 may include a combination of the HDMI port 971, the component jack 972, the PC port 973, and the USB port 974.

It will be readily understood by those of ordinary skill in the art that the configuration and operation of the I/O interface 970 may be implemented in various forms according to an embodiment of the disclosure.

The processor 980 controls all the operations of the display apparatus 900 and a flow of signals between the internal components of the display apparatus 900 and processes data. When an input is provided by the user or preset and stored conditions are satisfied, the processor 980 may execute an operating system (OS) and various applications stored in the memory 990.

The processor 980 may include a processor, RAM that stores signals or data input from outside of the display apparatus 900 or is used as a storage area corresponding to various operations performed by the display apparatus 900, and ROM that stores a control program for controlling the display apparatus 900.

The processor may include a GPU for processing graphics corresponding to video. The processor may be implemented as an SOC that integrates a core with the GPU. The processor may include a single core, a dual core (two cores), a triple core (three cores), a quad core (four cores), or a multiple number of cores therein.

Furthermore, the processor may include a plurality of processors. For example, the processor may be implemented as a main processor and a sub processor operating in a sleep mode.

A graphics processor generates a screen including various objects such as an icon, an image, a text, etc. by using an operator and a renderer. The operator calculates attribute values such as coordinate values, in which the objects are to be displayed according to a layout of a screen, shapes, sizes, and colors of the objects by using user interactions detected by a detector The renderer creates a screen having various layouts including the objects based on the attribute values calculated by the operator. The screen created by the renderer is displayed in a display region of the display 915.

Figure 10:
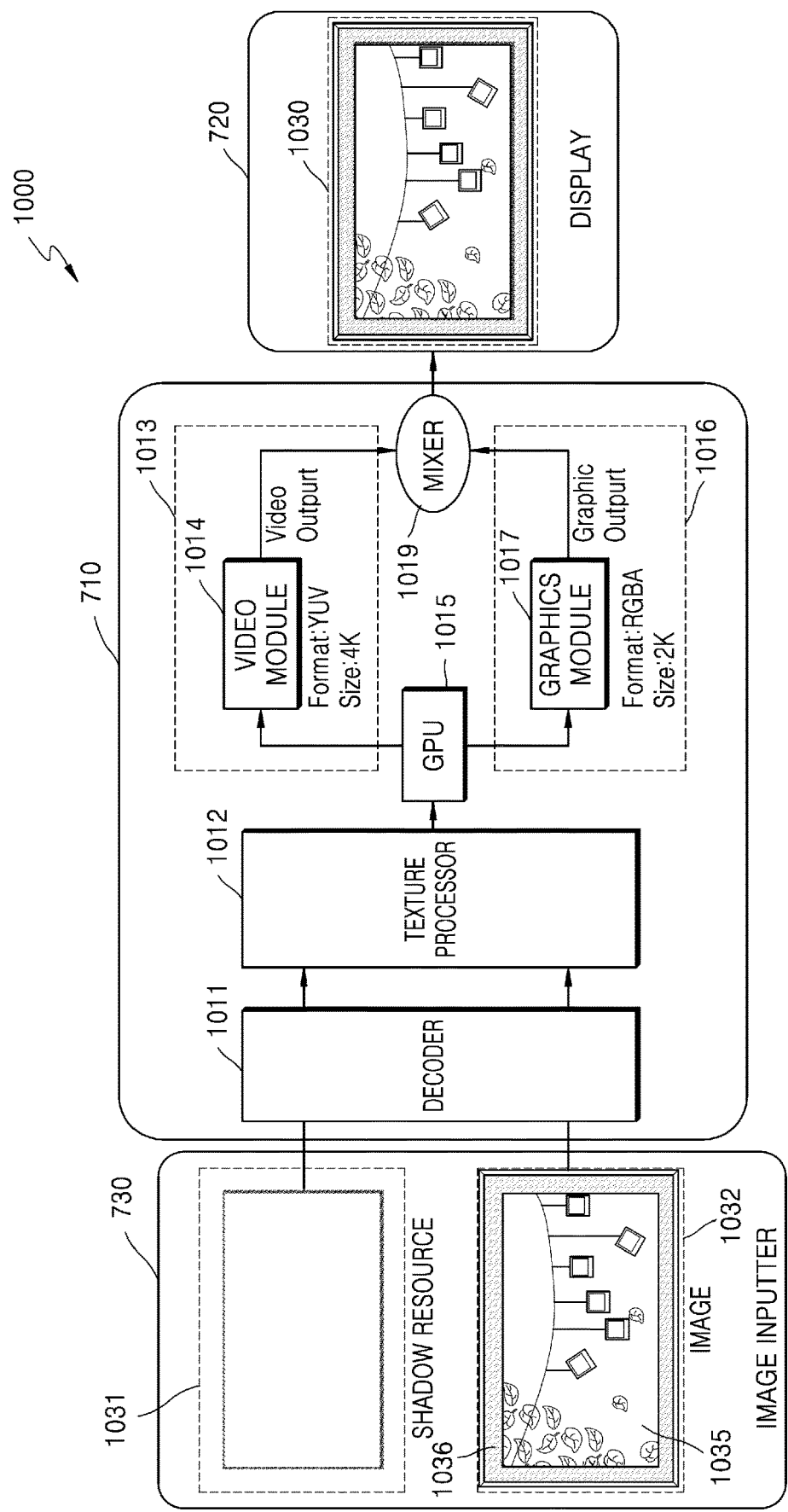
FIG. 10 is a detailed diagram of a display apparatus as illustrated in FIG. 7.

FIG. 10 is a detailed diagram of a display apparatus 1000 as illustrated in FIG. 7. In the accompanying drawings, the same reference numerals denote the same elements. In detail, the display apparatus 1000 includes the processor 710, the display 720, and the image inputter 730. The processor 710, the display 720, and the image inputter 730 included in the display apparatus 1000 respectively correspond to the processor 710, the display 720, and the image inputter 730 included in the display apparatus 800 of FIG. 8.

Referring to FIG. 10, the image inputter 730 may receive data necessary to generate an output image 1030.

In detail, the image inputter 730 may receive input data 1036 corresponding to a background image, input data 1035 corresponding to a content image, and input data 1031 corresponding to a shadow effect. For convenience of description, an example in which data used to generate a second image is the data 1031 corresponding to a shadow effect has been described and illustrated with reference the following figures including FIG. 10.

Furthermore, for convenience of description, FIG. 10 shows that pieces of data received by the image inputter 730 are separated into data to be processed by a video module 1014 and data to be processed by a graphics module 1017. In detail, data 1032 to be processed by the video module 1014 is illustrated separately from the data 1031 to be processed by the graphics module 1017.

Furthermore, although FIG. 10 shows that the input data 1036 corresponding to the background image is combined with the input data 1035 corresponding to the content image for reception, the image inputter 730 may receive the input data 1036 corresponding to the background image separately from the input data 1035 corresponding to the content image.

Referring to FIG. 10, the processor 710 may receive the pieces of data via the image inputter 730 and perform image processing for generating the output image 1030 to be displayed on the display 720.

In detail, the processor 710 may include a decoder 1011, a GPU 1015, a video module 1014, a graphics module 1017, and a mixer 1019. The processor 710 may further include a texture processor 1012.

The decoder 1011 receives and decodes first and second image resources. In this configuration, an image resource may mean data received via the image inputter 730 for use in generating an image. Thus, an image resource may be used for image generation.

In detail, the first image resource may be used to generate a first image. For example, the first image resource may include the data 1032. Furthermore, the second image resource may be used to generate a second image displayed on top of the first image. For example, the second image resource may include the data 1031.

The texture processor 1012 may convert each of the decoded first and second image resources into texture data.

In this configuration, converting a decoded image resource into texture data may include an operation of storing the decoded image resource in a 2D memory region corresponding to a 2D image such that the decoded image resource is used to generate an image. Thus, a component for converting an image resource into a texture data is referred to as the texture processor 1012 in FIG. 10 and may also be referred to as a memory, a video memory, a graphics memory, or the like. The texture processor 1012 may also add texture information to a decoded image resource for storage in a memory region.

Furthermore, the texture processor 1012 may include a plurality of memories respectively corresponding to image resources received via the image inputter 730. For example, the texture processor 1012 may include a memory for storing the decoded first image resource and a memory for storing the decoded second image resource.

According to an embodiment of the disclosure, the processor 710 may not include the texture processor 1012. In this configuration, data that has passed through the decoder 1011 may be transmitted directly to the GPU 1015.

For example, when the decoder 1011 decodes the input data 1036 corresponding to the background image, the input data 1035 corresponding to the content image, and the input data 1031 corresponding to the shadow effect to respectively output the decoded pieces of input data, the texture processor 1012 may include memories for respectively storing the decoded pieces of input data.

The GPU 1015 may render data, i.e., image data, stored in the texture processor 1012 and output a rendering result to at least one of the video module 1014 or the graphics module 1017.

In detail, when the GPU 1015 outputs the rendering result to the video module 1014, the GPU 1015 may convert the rendering result into a data format suitable for the video module 1014 and outputs data having the data format to the video module 1014. When the GPU 1015 outputs the rendering result to the graphics module 1017, the GPU 1015 converts the rendering result into a data format suitable for the graphics module 1017 and outputs data having the data format to the graphics module 1017.

In detail, as a result of the rendering, the GPU 1015 may output, to the video module 1014, data having a data format to be processed by the video module 1014, e.g., a data format to be processed on a first plane. For example, the GPU 1015 may render the data 1032 that has passed through the texture processor 1012 and output a rendering result to the video module 1014. In this configuration, the data output to the video module 1014 may have a YUV data format. Furthermore, as a result of the rendering, the GPU 1015 may output, to the graphics module 1017, data having a data format to be processed by the graphics module 1017, e.g., a data format to be processed on a second plane. For example, the GPU 1015 may render the data 1032 that has passed through the texture processor 1012 and output the resulting data to the graphics module 1017. In this configuration, the data output to the graphics module 1017 may have a RGBA format.

In detail, the GPU 1015 may determine whether a result of rendering is to be processed by the video module 1014 or the graphics module 1017 and output the rendering result to the video module 1014 or the graphics module 1017.

In detail, the GPU 1015 may receive the rendering result, select whether the rendering result, i.e., an image or image data, needs high-resolution output or low-resolution output, and output the rendering result to at least one of the video module 1014 or the graphics module 1017 according to a result of the selection.

The video module 1014 may generate a first image on the first plane by processing the rendered first image resource.

The graphics module 1017 may generate a second image on the second plane by processing the rendered second image resource. Furthermore, the graphics module 1017 may generate a third image based on the generated first and second images. In detail, the graphics module 1017 may generate a third image by copying an image, i.e., an output image generated by mixing the first and second images, on a third plane. In other words, the third image may be a copy of the output image generated on the third plane. Alternatively, the graphics module 1017 may generate a third image by copying each of the first and second images on the third plane. In other words, the third image may be an image obtained by mixing (or combining) copies of the first and second images generated on the third plane.

In detail, block 1013 represents a first path or pipeline for generating and/or processing an image on the first plane, and data generated and/or processed in block 1013 may have a YUV format. In addition, block 1016 represents a second path or pipeline for generating and/or processing an image on the second plane, and data generated and/or processed in block 1016 may have an RGBA format.

According to an embodiment of the disclosure, the video module 1014 may be a module supporting high-resolution output, and the graphics module 1017 may be a module supporting a low-resolution output compared to the video module 1014. For example, the video module 1014 may be a module supporting output of a 4K resolution, and the graphics module 1017 may be a module supporting output of a 2K resolution. For example, the video module 1014 may be a module supporting output of an 8K resolution, and the graphics module 1017 may be a module supporting output of a 1K, 2K or 4K resolution.

In other words, there is a quality difference between image data respectively output from the video module 1014 and the graphics module 1017, and the video module 1014 and the graphics module 1017 are responsible for processing and generating images via independent pipelines.

The mixer 1019 may generate an output image based on the first and second images. In detail, the mixer 1019 may generate an output image by mixing the first image generated by the video module 1014 with the second image generated by the graphics module 1017.

As described above, the video module 1014 and the graphics module 1017 respectively generate images by processing data via separate paths or pipelines. Furthermore, a plane on which the video module 1014 generates an image is the first plane, and a plane on which the graphics module 1017 generates an image is the second plane that is physically separate from the first plane. Accordingly, a time point at which a resource for the first image generated by the video module 1014 on the first plane is released is different from a time point at which a resource for the second image generated by the graphics module 1017 on the second plane is released. In other words, release of the resource for the first image occurs asynchronously with release of the resource for the second image. As a result, the first image and the second image may not be removed from the display at the same time.

In an embodiment of the disclosure, before release of a resource for the first image is requested, the graphics module 1017 may generate an image (in particular, the third image) corresponding to the output image on the third plane. In addition, when the release of the resource for the first image is requested, the processor 710 may control the third image generated on the third plane to be output onto the display 720. Accordingly, in an embodiment of the disclosure, the third image is output on the display 720 when the resource for the first image is released, thereby temporarily replacing the mixed image composed of the first image and the second image, and preventing output of the incomplete image 640 described with reference to FIG. 6. Thus, according to an embodiment of the disclosure, as described above, it is possible to alleviate the discomfort experienced by a viewer when release of the resource for the first image occurs asynchronously with release of the resource for the second image.

Thus, as described above, a resource necessary to process and/or generate an image on the first plane (e.g., a memory capacity, performance of high-end memory with a high processing speed, etc.) may have a greater capacity and achieve higher performance than a resource necessary to process and/or generate an image on the second plane.

For example, a video plane that is the first plane may support processing and/or generation of an image having a resolution of 8K, and a graphic plane that is the second plane may support processing and/or generation of an image having a resolution of 2K or 4K. In this configuration, the amount of memory allocated to the video plane may be greater than the amount of memory allocated to the graphic plane, and performance such as a processing speed of the memory allocated to the video plane may be higher than performance such as a processing speed of the memory allocated to the graphic plane.

Thus, when the first plane is a video plane, the second and third planes are graphic planes, and the third image is generated on the third plane, it is possible to quickly generate the third image by using reduced resources (e.g., memory capacity, memory specifications, etc.).

Figure 11:
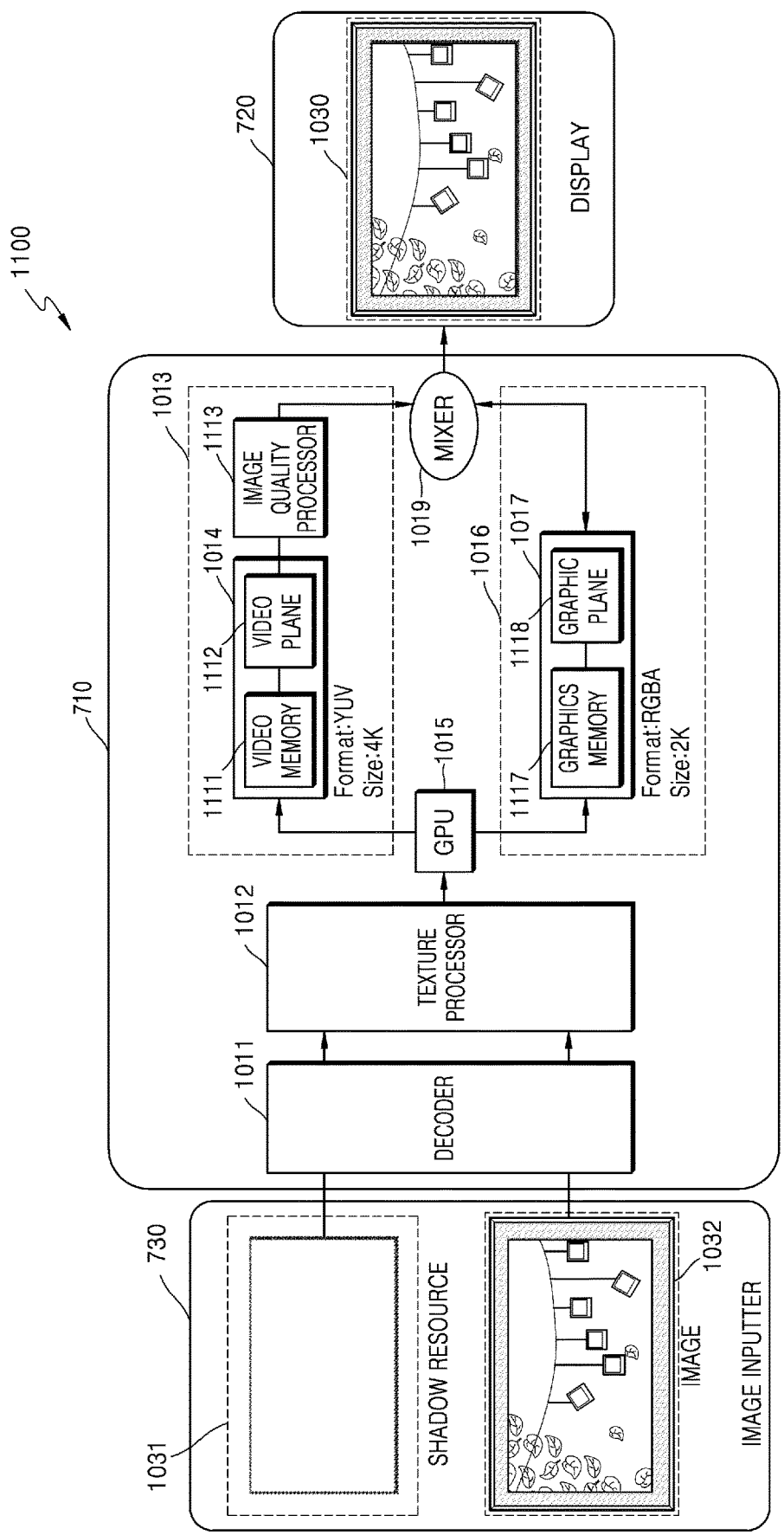
FIG. 11 is a detailed diagram of a display apparatus as illustrated in FIG. 10.

FIG. 11 is a detailed diagram of a display apparatus 1100 illustrated in FIG. 10. In the display apparatus 1100 of FIG. 11, the same components as in the display apparatus 1000 of FIG. 10 are represented by the same reference numerals. Thus, redundant descriptions with respect to FIGS. 1 through 10 will be omitted when describing the display apparatus 1100.

Referring to FIG. 11, the video module 1014 may include a video memory 1111 and a video plane 1112. The graphics module 1017 may include a graphics memory 1117 and a graphic plane 1118. Although FIG. 11 illustrates an example in which the video memory 1111 and the video plane 1112 are sequentially arranged, the video memory 1111 may be connected to a subsequent end of the video plane 1112 after the video plane 1112 is arranged. Furthermore, after the graphic plane 1118 is arranged, the graphics memory 1117 may be connected to a subsequent end of the graphic plane 1118.

In particular, the video memory 1111 may receive and store data (in particular, image data used for image generation) output from the GPU 1015. In this configuration, the video memory 1111 may include a plurality of separate memory regions and may respectively store different pieces of image data in the plurality of separate memory regions.

The video memory 1111 may receive and store data having a format corresponding to the first plane. In detail, the video memory 1111 may be formed as a buffer. The video memory 1111 formed as a buffer may receive and store YUV data in a video format. In detail, the video memory 1111 may be formed as a scaler buffer and may perform appropriate scaling such that the received YUV data corresponds to an output image for storage. For example, the scaler buffer included in the video memory 1111 may perform scaling according to an image frame to be output onto the display 720.

The video plane 1112 may store an image, in particular, an image frame, which is output after being stored in the video memory 1111. Here, storing an image frame in the video plane 1112 may be understood as writing values of pixels constituting the image frame to the video plane 1112.

For convenience of description, an image frame stored in the video plane 1112 may be referred to as a video frame, and an image frame stored in the graphic plane 1118 may be referred to as a graphic frame.

Furthermore, the video plane 1112 may receive an image stored in the video memory 1111 and perform image quality setting on the received image for storage.

In detail, the video plane 1112 may be referred to as a buffer that obtains and stores video frames to be output on a screen of the display 720 of the display apparatus 1100. For example, the video plane 1112 may be a buffer that used to obtain and store video frames to be output on a screen of the display 720 of the display apparatus 1100. In detail, the buffer corresponding to the video plane 1112 may be a video buffer. One video frame may be stored in one video plane. In this configuration, a video frame means an image to be displayed on the display 720.

When the processor 710 includes the video plane 1112, the display apparatus 1100 may store a next video frame in the video plane 1112 after outputting a current video frame. Although FIG. 11 shows an example in which the processor 710 includes the one video plane 1112, the processor 710 may include a plurality of video planes 1112. When the processor 710 includes the plurality of video planes 1112, the processor 710 may process a plurality of frames in parallel.

Furthermore, the processor 710 may further include the image quality processor 1113. The image quality processor 1113 may perform image quality correction on an image (specifically, a video frame) output from the video module 1014. Here, an example of the image quality correction may include at least one of color enhancement, luminance enhancement, contrast processing, RGB correction, or noise removal. In detail, the image quality correction may be understood as performing at least one of color enhancement, luminance enhancement, contrast processing, RGB correction, or noise removal on the received image such that the output image 1030 may be generated with an optimized quality corresponding to a data source.

Referring to FIG. 11, the graphics module 1017 may include the graphics memory 1117 and the graphic plane 1118.

The graphics memory 1117 may receive and store data (in particular, image data used for image generation) output from the GPU 1015. In this configuration, the graphics memory 1117 may include a plurality of separate memory regions and respectively store different pieces of image data in the plurality of separate memory regions.

The graphics memory 1117 may receive and store data having a format corresponding to the second plane. In detail, the graphics memory 1117 may be formed as a buffer. In more detail, the graphics memory 1117 may be formed as a frame buffer that stores data received in the form of a frame. For example, the graphics memory 1117 formed as a buffer may receive and store RGBA data in a graphic format.

Furthermore, the graphics memory 1117 may perform appropriate scaling such that the received RGBA data corresponds to an output image for storage.

The graphic plane 1118 may store an image, in particular, an image frame, which is output after being stored in the graphics memory 1117. In detail, the processor 710 may draw, on the graphic plane 1118, a graphic image to be displayed on the display 720, for example, an image showing a shadow effect. In this configuration, drawing a frame image on the graphic plane 1118 may be understood as writing values of pixels constituting the frame image to the graphic plane 1118. For example, the graphic plane 1118 may be a buffer that used to obtain and store graphic images or graphic frames to be output on a screen of the display 720 of the display apparatus 1100. In detail, the buffer corresponding to the graphic plane 1118 may be a graphic buffer.

In detail, an image frame stored in the graphic plane 1118 may be formed by a plurality of pixel values. A pixel value may be RGBA data, which may be expressed as (R, G, B, alpha). Here, R, G, and B denote red data, green data, and blue data, respectively. For example, when each of R, G, and B data is represented by 8 bits, each of R, G, and B has any one of 256 levels. R, G, and B expressed at their respective levels may be color-mixed to represent a color. For example, RGBA data may represent white when data values for RGB among (R, G, B, alpha) are set to (255, 255, 255) and represent black when the data values for RGB are set to (0, 0, 0).

In other words, when a graphic frame is drawn on the graphic plane 1118 by the processor 710, the graphic frame may be temporarily stored in the graphic plane 1118. In addition, the display apparatus 1100 may output the obtained graphic frame on the screen. When the graphic frame is output, the display apparatus 1100 may draw a next graphic frame on the graphic plane 1118.

Furthermore, the processor 710 may further include an image quality processor in a subsequent end of the graphic plane 1118. Because the configuration and operation of the image quality processor connected to the subsequent end of the graphic plane 1118 are the same as those of the image quality processor 1113 described above, redundant descriptions thereof will be omitted.

Furthermore, the mixer 1019 may mix an image frame, i.e., a video frame output from block 1013 with an image frame, i.e., a graphic frame output from block 1016 and output a mixture of the video frame and the graphic frame onto the display 720. Here, an image frame output from block 1013 may be referred to as a first image, and an image frame output from block 1016 may be referred to as a second image. In other words, the mixer 1019 mixes the first and second images and outputs a mixed image thereof.

Accordingly, the display 720 may display the output image 1030. The output image 1030 may be an image including a shadow effect superimposed on the content image (or an image obtained by combining the content image with the background image) corresponding to the data 1032.

In an embodiment of the disclosure, when generation of the first and second images is completed, the graphics module 1017 may generate a third image based on the first and second images. An operation of generating the third image will now be described in detail with reference to FIG. 12.

Figure 12:
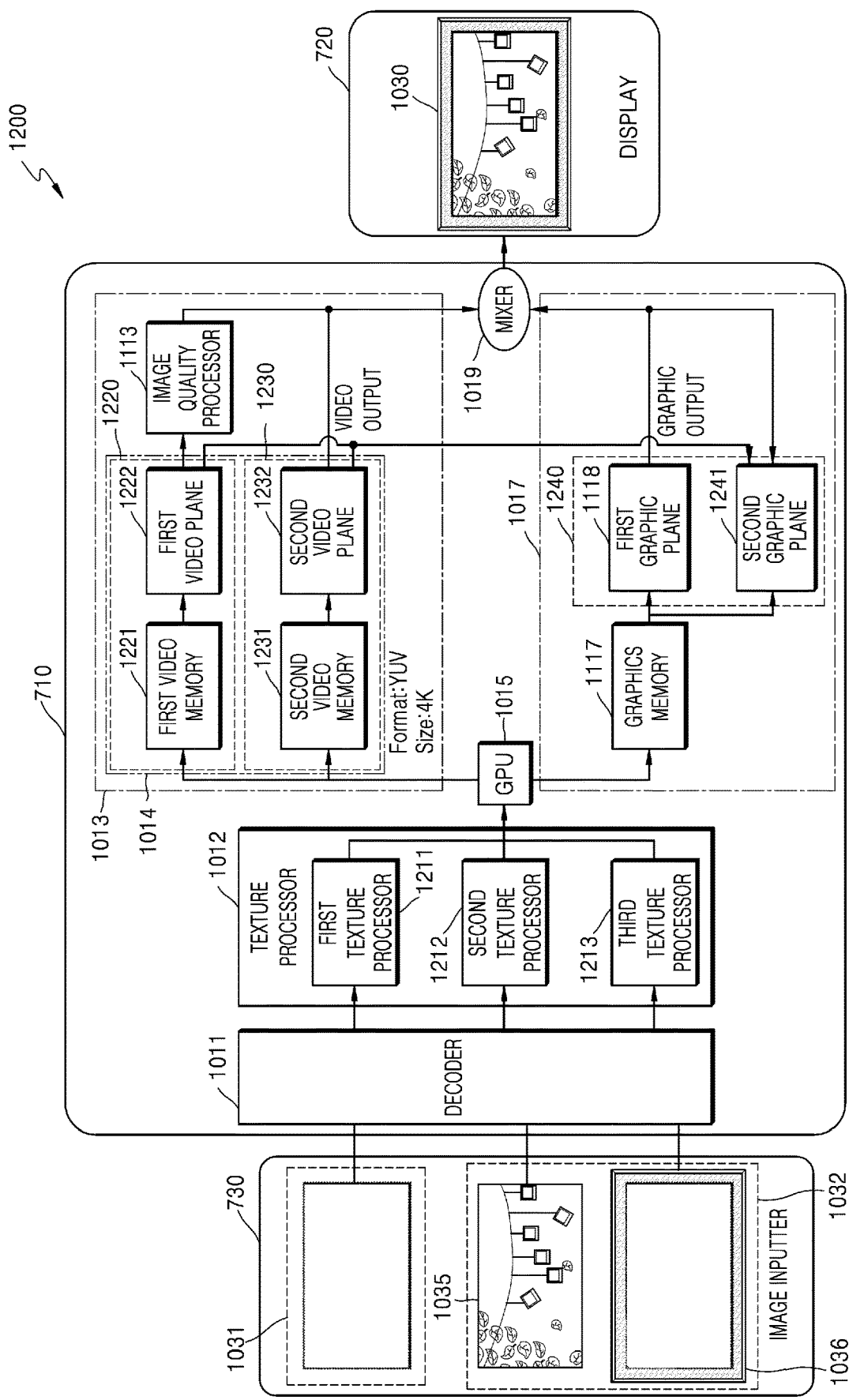
FIG. 12 is a detailed diagram of a display apparatus as illustrated in FIG. 7.

FIG. 12 is a detailed diagram of a display apparatus 1200 as illustrated in FIG. 7. In the display apparatus 1200 of FIG. 12, the same components as those in the display apparatus 1100 of FIG. 11 are represented by the same reference numerals. Thus, redundant descriptions with respect to FIGS. 1 through 11 will be omitted when describing the display apparatus 1200.

Referring to FIG. 12, the video module 1014 may include a plurality of pipelines 1220 and 1230 for processing a plurality of image frames in parallel. In detail, each pipeline of the plurality of pipelines 1220 and 1230 included in the video module 1014 may include components corresponding to the video memory 1111 and the video plane 1112 described with reference to FIG. 11.

In detail, the video module 1014 includes the first pipeline 1220 consisting of a first video memory 1221 and a first video plane 1222 and the second pipeline 1230 consisting of a second video memory 1231 and a second video plane 1232.

In this configuration, the first and second pipelines 1220 and 1230 may each receive YUV data and generate a corresponding image frame.

In detail, FIG. 12 shows an example in which the display apparatus 1200 displays the output image 300 obtaining by applying the shadow effect 320 to an image obtained by combining the content image 310 with the background image 312, as shown and described with reference to FIG. 5. In this configuration, the first pipeline 1220 may receive source data corresponding to the content image 310 to generate a frame image corresponding to the content image 310, and the second pipeline 1230 may receive source data corresponding to the background image 312, in particular, a wallpaper image to generate a frame image corresponding to the background image 312. In addition, the video module 1014 may perform image quality processing on an image obtained by combining the frame image output from the first pipeline 1220 with the frame image output from the second pipeline 1230 and output the resulting image to the mixer 1019. For example, the image obtained by combining the frame image output from the first pipeline 1220 with the frame image output from the second pipeline 1230 may correspond to the first image 510 shown in FIG. 5.

For example, when the background image 312 is not combined along the outside of the content image 310 and displayed, the content image 310 itself may be a first image. In addition, when the background image 312 is combined along outside of the content image 310 and then displayed, an image obtained by combining the content image 310 with the background image 312 may be the first image.

Furthermore, referring to FIG. 12, the graphics module 1017 may include a plurality of graphic planes. In detail, while FIG. 11 shows an example in which the graphics module 1017 includes one graphic plane 1118, the graphics module 1017 shown in FIG. 12 may include a plurality of graphic planes. FIG. 12 shows an example in which the graphics module 1017 includes two graphic planes, i.e., a first graphic plane 1118 and a second graphic plane 1241.

The second graphic plane 1241 may store a frame image corresponding to a third image. In detail, the second graphic plane 1241 may generate and store the third image based on a second image stored in the first graphic plane 1118 and a first image output from the video module 1014.

In detail, the second graphic plane 1241 may generate the third image by copying, on a third plane corresponding to a second plane, an output image from the mixer 1019 that is an image obtained by mixing the first image with the second image. In this configuration, the third plane in which image frames are stored in the second graphic plane 1241 is the same type of plane as the second plane in which image frames are stored in the first graphic plane 1118. In other words, the third image may be a copy of the output image generated on the third plane.

Alternatively, the second graphic plane 1241 may generate the third image by copying each of the first and second images on the third plane. In other words, the third image may be an image obtained by mixing (or combining) copies of the first and second images generated on the third plane.

Figure 13:
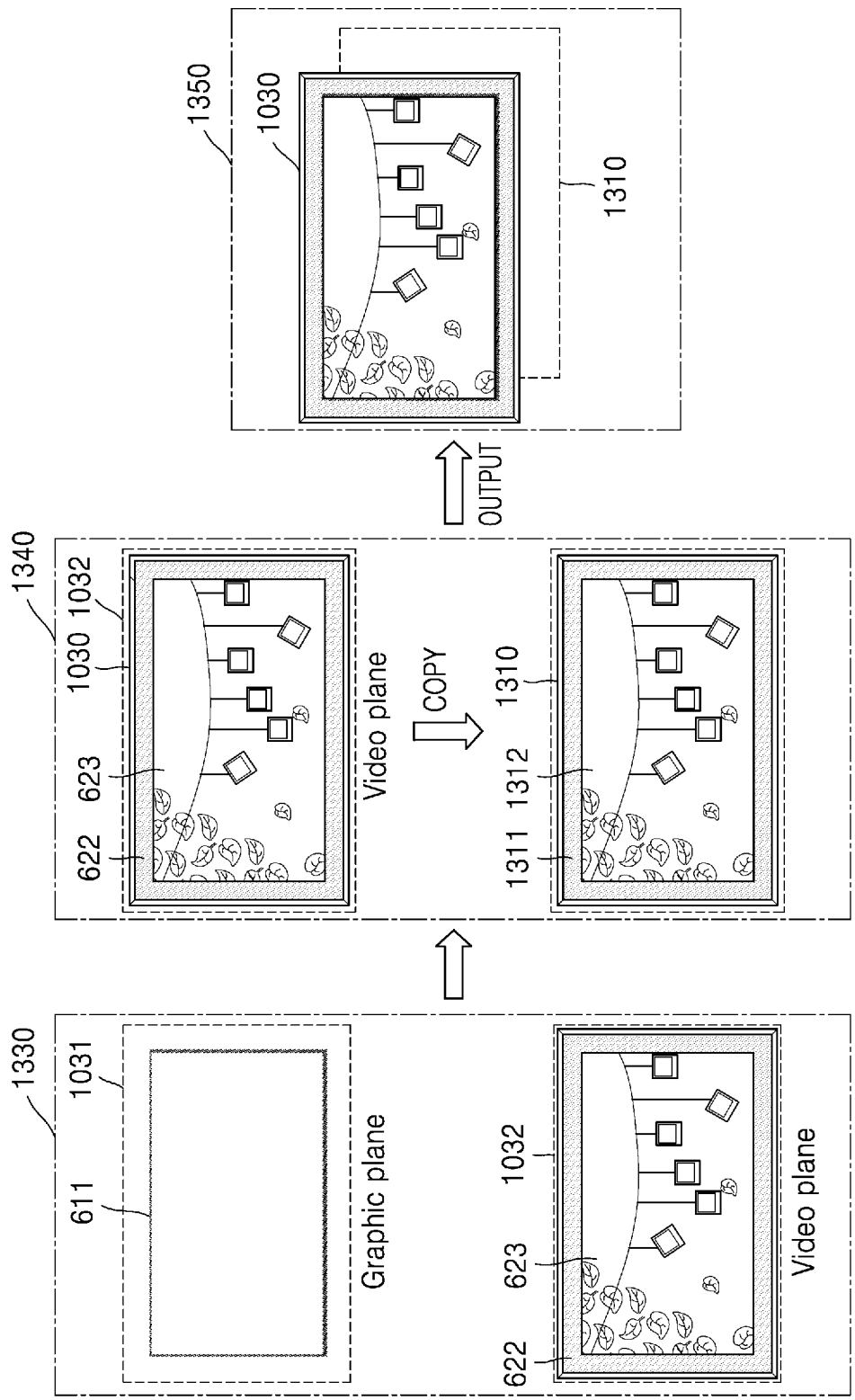
FIG. 13 is a diagram for describing an image output operation performed according to an embodiment of the disclosure.
Figure 14:
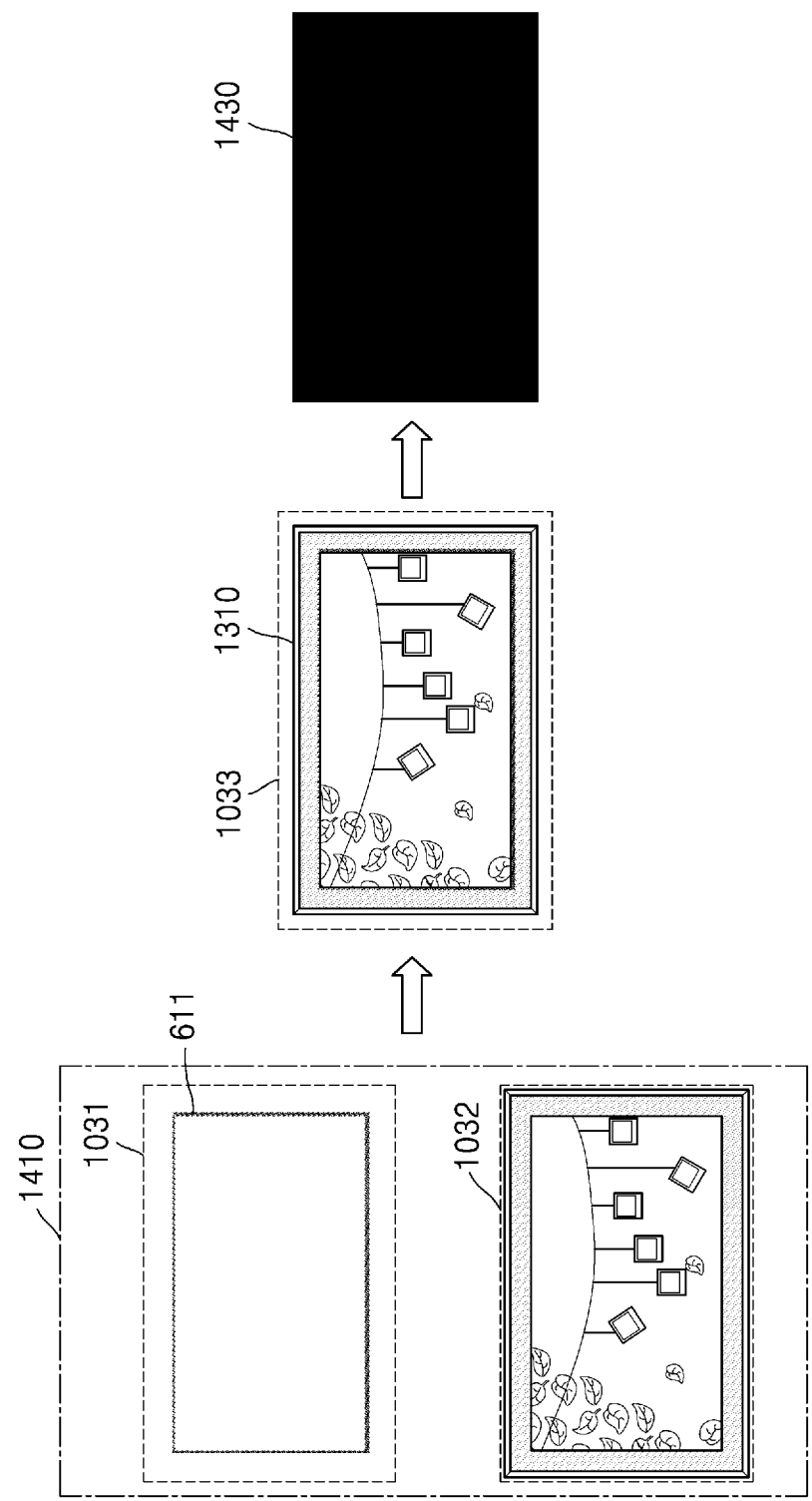
FIG. 14 is a diagram for describing an image output operation performed according to an embodiment of the disclosure.

FIG. 13 is a diagram for describing an image output operation performed according to an embodiment of the disclosure. FIG. 14 is a diagram for describing an image output operation performed according to an embodiment of the disclosure. The image output operation will now be described in detail with reference to FIGS. 13 and 14 together with the configuration of the display apparatus 1200 of FIG. 12.

Referring to blocks 1330 and 1340 of FIG. 13, the output image 1030 is obtained by mixing a second image showing a shadow effect 611, which is generated based on the input data 1031 corresponding to the shadow effect 611, with a first image generated based on the data 1032 to be processed by the video module 1014 and then displayed on the display 720. In this configuration, the output image 1030 may be a frame image output from the mixer 1019. When the generation of the first and second images is completed, the processor 710 may generate a third image 1310 based on the first and second images.

Referring to block 1350, while the display 720 displays the output image 1030, the third image 1310 is on a third plane located below a first plane where the output image 1030 exists. Thus, the third image 1310 is not displayed while the output image 1030 is displayed on the display 720 because the third image 1310 is output onto the display 720 later than the output image 1030.

In this configuration, the third image is an image generated on the third plane, e.g., a graphic plane, and may be an image generated based on the first and second images.

Referring to block 1410 of FIG. 14, a second image showing a shadow effect 611 and a third image 1310 are on a graphic plane while a first image generated based on the data 1032 to be processed by the video module 1014 is on a video plane. After the output image 1030 is displayed, when resources for the first and second images are released, the first image is first removed and then the second image is removed after several seconds have elapsed from removal of the first image. According to an embodiment of the disclosure, the third image 1310 may be displayed during a time interval between a time point when the first image is removed from the display due to release of the resource for the first image and a time point when the second is removed from the display due to release of the resource for the second image.

Subsequently, when the second image is completely removed on the graphic plane, the display apparatus 1200 outputs a completely black image 1430 as both the first and second images are removed. Thus, according to an embodiment of the disclosure, it is possible to prevent the output of the incomplete image 640 described with reference to FIG. 6.

Figure 15:
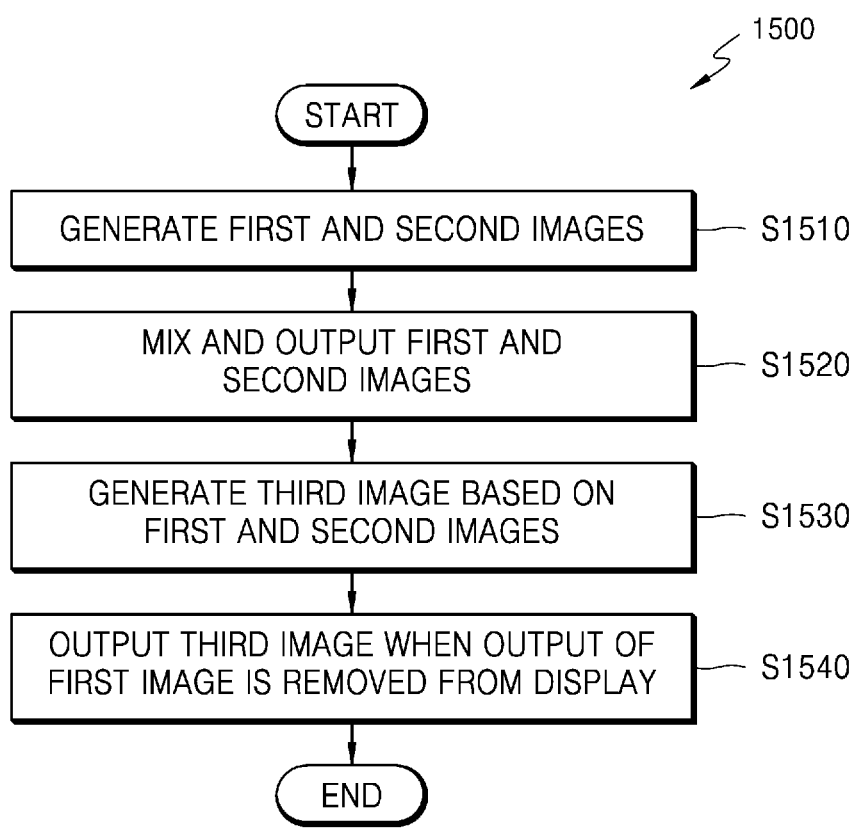
FIG. 15 is a flowchart of a method of operating a display apparatus, according to an embodiment of the disclosure.

FIG. 15 is a flowchart of an operation method 1500 of a display apparatus, according to an embodiment of the disclosure. The operation method 1500 of the display apparatus illustrated in FIG. 15 may be performed by the display apparatus 700, 800, 900, 1000, 1100 or 1200 according to the embodiment of the disclosure. Operations included in the operation method 1500 of the display apparatus may correspond to the operations performed by the display apparatus 700, 800, 900, 1000, 1100, or 1200 described with reference to FIGS. 1 through 14. Thus, redundant descriptions with respect to FIGS. 1 through 14 will be omitted when describing the operation method 1500. Hereinafter, the operation method 1500 will be described in detail with reference to components of the display apparatus 1200 of FIG. 12.

Referring to FIG. 15, the operation method 1500 is an operation method of the display apparatus (1200 of FIG. 12) for generating and outputting an image via the display 720.

In the operation method 1500 of the display apparatus 1200, a first image corresponding to content is generated on a first plane, and a second image to be added to the first image is generated on a second plane (S1510). In detail, operation S1510 may be performed by the processor 710 of the display apparatus 1200. Furthermore, generation of the first image and generation of the second image may be performed in parallel via independent paths or pipelines. In detail, the first image may be generated via a path in the video module 1014 while and the second image may be generated via a path in the graphics module 1017.

In the operation method 1500 of the display apparatus 1200, the first and second images are mixed and then a mixed image of the first and second images is output on the display 720 (S1520). In detail, operation S1520 may be performed by the display 720 according to control by the processor 710 of the display apparatus 1200. In detail, in the operation method 1500 of the display apparatus 1200, an output image 1030 obtained by mixing the first image with the second image may be output on the display 720.

Subsequently, in the operation method 1500 of the display apparatus 1200, a third image is generated on a third plane corresponding to the second plane based on the first and second images (S1530). In detail, operation S1530 may be performed by the processor 710 of the display apparatus 1200. Furthermore, although FIG. 15 shows that operation S1530 is performed after operation S1520, operation S1530 may be performed in parallel when generation of the first and second images is completed in operation S1510 even before operation S1520 is completed.

In the operation method 1500 of the display apparatus 1200, when the first image is removed from the display, the third image is output on the display 720 (S1540). In detail, operation S1540 may be performed by the display 720 according to control by the processor 710 of the display apparatus 1200.

Figure 16:
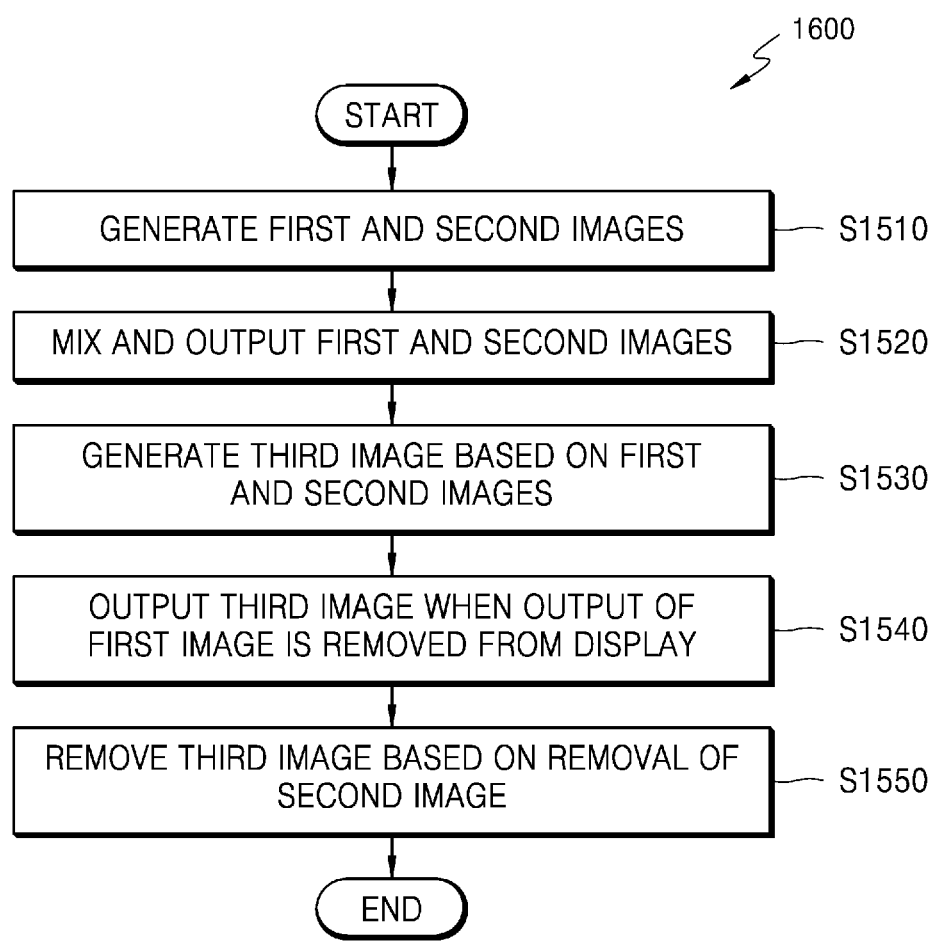
FIG. 16 is a flowchart of a method of operating a display apparatus, according to an embodiment of the disclosure.

FIG. 16 is a flowchart of an operation method 1600 of the display apparatus 1200, according to an embodiment of the disclosure. In FIG. 16, the same operations as those in FIG. 15 are represented by the same reference numerals. Thus, redundant descriptions with respect to FIG. 15 will be omitted.

Referring to FIG. 16, the operation method 1600 of the display apparatus 1200 may further include operation S1550 in comparison to the operation method 1500 of the display apparatus 1200.

Subsequent to operation S1540, in the operation method 1600 of the display apparatus 1200, the third image is removed from the display based on removal of the second image (S1550) from the display. In other words, once the second image has been removed from the display, the third image may also be simultaneously or subsequently removed from the display. In detail, operation S1550 may be performed by the processor 710 of the display apparatus 1200.

Operation methods of a display apparatus according to embodiments of the disclosure may be implemented in the form of program instructions executable by various types of computers and may be recorded on computer-readable recording media. Furthermore, according to an embodiment of the disclosure, computer-readable recording media having recorded thereon one or more programs including instructions for performing an operation method of a display apparatus may be provided.

The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also higher level language code executable by a computer using an interpreter or the like.

The computer-readable storage medium may be provided in the form of a non-transitory storage medium. In this regard, the term 'non-transitory' only means that the storage medium does not include a signal and is tangible, and the term does not distinguish between data that is semi-permanently stored and data that is temporarily stored in the storage medium. For example, the 'non-transitory storage medium' may include a buffer in which data is temporarily stored.

According to an embodiment of the disclosure, operation methods of a display apparatus according to various embodiments of the disclosure may be included in a computer program product when provided. The computer program product may be traded, as a product, between a seller and a buyer. For example, the computer program product may be distributed in the form of a device-readable storage medium (e.g., CD-ROM) or distributed (e.g., downloaded or uploaded) on-line via an application store (e.g., Google™, Play Store™) or directly between two user devices (e.g., smartphones). For online distribution, at least a part of the computer program product (e.g., a downloadable app) may be at least transiently stored or temporally generated on a device-readable storage medium such as a server of a manufacturer, a server of an application store, or a memory of a relay server.

In detail, the operation methods of the display apparatus according to the embodiments of the disclosure may be implemented as a computer program product including a recording medium having stored therein a program for performing operations of: obtaining a sentence in multiple languages; and using a multilingual translation model to obtain vector values respectively corresponding to words in the multilingual sentence, convert the obtained vector values to vector values corresponding to a target language, and obtain a sentence in the target language based on the resulting vector values.

A display apparatus and operation method thereof according to embodiments of the disclosure may eliminate discomfort experienced by the user when viewing the display apparatus.

In detail, after a plurality of images corresponding to a plurality of data formats are mixed and then output, the display apparatus and operation method thereof according to the embodiments of the disclosure may prevent incomplete images from being displayed when the outputs of the plurality of images are completed. Accordingly, it is possible to eliminate discomfort experienced by the user when viewing a screen output on a display.

While one or more embodiments of the disclosure have been particularly described with reference to the figures, it will be understood by those of ordinary skill in the art that the embodiments of the disclosure are not to be construed as limiting the scope of the disclosure and various changes and modifications made by one of ordinary skill in the art based on the basic concept of the disclosure also fall within the scope as defined by the following claims.

What is claimed is:

1. A display apparatus comprising:
a display; and
a processor configured to execute at least one instruction to:
generate, on a first plane, a first image corresponding to video content,
generate, on a second plane, a second image,
control the display to output a mixed image that is a mixture of the first image and the second image;
generate a third image corresponding to the mixed image, on a third plane which is a same type of a plane as a type of the second plane; and
based on the first image being removed, prior to removal of the second image, from the display, control the display to output the third image.

2. The display apparatus of claim 1, wherein the processor is further configured to execute the at least one instruction to:
control the display to remove the first image from the display,
control the display to display the third image based on removal of the first image from the display,
control the display to remove the second image from the display, and
control the display to remove the third image from the display based on the removal of the second image from the display.

3. The display apparatus of claim 2, wherein the processor is further configured to execute the at least one instruction to, generate the third image by copying the mixed image on the third plane.

4. The display apparatus of claim 2, wherein a first resolution of the first plane is higher than a second resolution of the second plane, and
wherein a third resolution of the third plane is equal to the second resolution of the second plane.

5. The display apparatus of claim 2, wherein a third display priority of the third plane is lower than a first display priority of the first plane and higher than a second display priority of the second plane.

6. The display apparatus of claim 2, wherein the first plane is a video plane, and
wherein the second plane and the third plane are graphic planes.

7. The display apparatus of claim 6, wherein the video plane is configured to store an image in a luminance-chrominance (YUV) color space, and
wherein the graphic planes are configured to store an image in a red-green-blue-alpha (RGBA) color space.

8. The display apparatus of claim 2, wherein the second image is superimposed over the first image in the mixed image.

9. The display apparatus of claim 2, wherein the first image is an image corresponding to video content, and
wherein the second image comprises at least one of a caption and an on screen display (OSD) menu.

10. The display apparatus of claim 2, wherein the processor comprises:
a decoder configured to receive and decode a first image signal as the first image and a second image signal as the second image;
a texture processor configured to store textures of the first image and the second image;
a renderer configured to render the first image and the second image based on the textures;
a video module configured to generate the first image on the first plane by processing the rendered first image;
a graphics module configured to generate the second image on the second plane by processing the rendered second image and generate the third image on the third plane; and
a mixer configured to mix the first image and the second image as the mixed image.

11. The display apparatus of claim 10, wherein the video module is further configured to generate the first image by scaling and correcting the first image on the first plane.

12. The display apparatus of claim 10, wherein the graphics module is further configured to generate the second image by scaling and correcting the second image on the second plane.

13. The display apparatus of claim 10, wherein the video module supports a resolution higher than a resolution of the graphics module.

14. A method of operating a display apparatus for outputting an image via a display, the method comprising:
generating, on a first plane, a first image corresponding to video content;
generating, on a second plane, a second image;
outputting on the display a mixed image that is a mixture of the first image and the second image;
generating a third image corresponding to the mixed image, on a third plane which is a same type of a plane as a type of the second plane; and
based on the first image being removed, prior to removal of the second image, from the display, outputting on the display the third image.

15. The method of claim 14, further comprising:
removing the first image from the display;
outputting on the display the third image based on removal of the first image from the display;
removing the second image from the display; and
removing the third image from the display based on the removal of the second image from the display.

16. The method of claim 15, wherein the generating of the third image comprises copying the mixed image on the third plane.

17. The method of claim 15, wherein a first resolution of the first plane is higher than a second resolution of the second plane, and
wherein a third resolution of the third plane is equal to the second resolution of the second plane.

18. The method of claim 15, wherein a third display priority of the third plane is lower than a first display priority of the first plane and higher than a second display priority of the second plane.

* * * * *